(12) United States Patent
Snyder et al.

(10) Patent No.: US 8,052,426 B2
(45) Date of Patent: Nov. 8, 2011

(54) SYSTEM FOR SCHEDULING CLASSES AND MANAGING EDUCATIONAL RESOURCES

(76) Inventors: Jonathan Scott Snyder, New York, NY (US); Adrian Bradford Robert, Ann Arbor, MI (US)

( * ) Notice: Subject to any disclaimer, the term of this patent is extended or adjusted under 35 U.S.C. 154(b) by 703 days.

(21) Appl. No.: 11/929,256

(22) Filed: Oct. 30, 2007

(65) Prior Publication Data

US 2008/0057482 A1 Mar. 6, 2008

Related U.S. Application Data

(63) Continuation of application No. 10/293,868, filed on Nov. 13, 2002, now abandoned, and a continuation-in-part of application No. 10/258,496, filed as application No. PCT/IL01/00376 on Apr. 23, 2001, now abandoned.

(60) Provisional application No. 60/199,309, filed on Apr. 24, 2000, provisional application No. 60/331,241, filed on Nov. 13, 2001.

(51) Int. Cl.
 *G09B 11/00* (2006.01)
(52) U.S. Cl. ...................................... 434/365; 705/7.13
(58) Field of Classification Search .................. 434/322, 434/323, 350, 353, 362; 705/8
 See application file for complete search history.

(56) References Cited

U.S. PATENT DOCUMENTS 6,325,632 B1 * 12/2001 Chao et al. .................... 434/322

OTHER PUBLICATIONS

"School Scheduling by Computer- The Story of Gasp", Murphy, Judith, 1964 Educational Facilities Laboratories, Inc.*
"An Assessment of the Current Status of Computerized Scheduling of Secondary School Classes", Dissertation of George Allen Mundrake, Mar. 1980, The University of Tennessee, Knoxville.*

* cited by examiner

*Primary Examiner* — Kathleen Mosser

(57) ABSTRACT

A method is provided for automatically producing a schedule of classes for an educational institution having a plurality of teachers, a plurality of students, and a curriculum. The method preferably includes receiving designations of a plurality of curriculum modules of the curriculum, each curriculum module including educational material, one or more of the curriculum modules being prerequisite modules for one or more subsequent modules. The method also preferably includes receiving, as an input into a computer system, curriculum information comprising an indication of which of the modules are prerequisite modules for subsequent modules. An input into the computer system includes student information comprising, for one or more of the plurality of students, an indication of his level of competence with respect to the educational material of one or more modules. The computer system preferably produces a schedule of classes for teaching the educational material of at least some of the modules responsive to the curriculum information and the student information. Educational material to be taught in each of the scheduled classes includes the educational material of a respective one of the curriculum modules. The students assigned to each of the scheduled classes have preferably attained at least a predetermined level of competence with respect to the educational material of the respective modules that are prerequisite modules for the module to be taught in the class.

20 Claims, 7 Drawing Sheets

SYSTEM FOR SCHEDULING CLASSES AND MANAGING EDUCATIONAL RESOURCES

CROSS REFERENCES TO RELATED APPLICATIONS

This application is a continuation of prior application Ser. No. 10/293,868, filed Nov. 13, 2002, which claims the benefit of U.S. Provisional Application No. 60/331,241, filed Nov. 13, 2001. This application is also a continuation-in-part of prior application Ser. No. 10/258,496, filed Jul. 24, 2003, which was the National Stage of International Application No. PCT/IL01/00376, filed Apr. 23, 2001, which claimed the benefit of U.S. Provisional Application No. 60/199,309, filed Apr. 24, 2000. The entire contents of all the above applications is herein incorporated by reference for all purposes.

FIELD OF THE INVENTION

The present invention relates in general to the field of educational scheduling software. In particular, it preferably comprises a novel system for flexibly and dynamically allocating students to classes and for producing teaching and class schedules. In a preferred embodiment, the present invention enables educational institutions to be administered more efficiently, and has far-reaching effects in improving the quality of the teaching and learning that take place in educational institutions.

BACKGROUND OF THE INVENTION

It has long been recognized that the structure of traditional educational institutions is not conducive to optimizing the quality of the teaching and the learning that take place in them. This is particularly true of elementary, junior and senior high school education (grades K-12), both public and private, but is also true even with regard to higher education, vocational schools, home schooling, and job training within corporations.

One of the main reasons for this is that in traditional educational institutions, students having multiple skill and knowledge levels are grouped together in classes, and are taught large amounts of curricular material over large stretches of time (a semester, quarter or even a complete school year). In this structure, students advance from one level to another within the educational institution without mastering sufficient amounts of the curriculum. Their advancement is based upon a "passing grade," which is an average grade across a fairly large number of individual topics and which often is a fairly low grade, such as a C, that does not indicate any real mastery of the curriculum being taught. Moreover, students can have below C grades in several individual topics, and still end up with an average passing grade. As a result, most students over time develop serious gaps in mastery of the knowledge base that the curriculum represents.

In traditional educational institutions, many of the students grouped together in the same class are often unprepared to learn the topic at hand, because of the large number of gaps they have accumulated in their knowledge repertoire. This is a major problem for teachers, who are compelled to teach to multiple levels of students at the same time. To handle this, teachers sometimes try to subdivide their classroom into smaller groups, but this is generally an inadequate solution, since it means the teacher cannot focus on the entire class at once. In any event, even subdividing into groups will not necessarily put all the students within a group at the same skill or knowledge mastery level.

The large size of the classes (often 30 students or more) is another reason why the teaching and learning in most traditional educational institutions is far from optimum. There are different estimates as to what the ideal class size is, both for the teacher and the students, but few would deny that an average class size of 15 is better than 30. Yet, within the current structure of most educational institutions, the only way to reduce the average class size is to hire more teachers, or to allow fewer students into the school, neither of which is typically a realistic option for budgetary or political reasons.

An additional reason why teaching and learning in most traditional educational institutions is far from optimum is that the curriculum units are too large. It is generally recognized that some parts of the curriculum are more important than others, and should be given greater emphasis and reviewed more often. However, in traditional educational institutions, almost all curriculum units are spread over equally large blocks of time, sometimes whole semesters or quarters, and teachers often have little flexibility to focus on and emphasize the core skills and units of knowledge. They are forced to go on to new material in order to fill in the term adequately. Moreover, because of the relatively rigid structure of the school curriculum, once a topic has been taught, it is more often than not seldom taken up again, preventing substantive review and a deepening of the students' knowledge of the core subjects and skills.

Another flaw in the structure of traditional educational institutions is the way in which both teachers and students are assigned to their classes. The assignment is generally done based upon subject, grade or year level, with limited regard to factors that may affect many of the students' ability to learn (such as prior successful or unsuccessful experience with a particular teacher) or the teachers' readiness to teach (such as a strong interest or lack of interest in teaching a particular subject or topic). It is well known that rapport between teachers and students is an important factor in the quality of education, and that certain students do better with certain teachers rather than others. It is also well known that teachers do a better job when they teach topics they prefer to teach. Yet, traditional educational institutions do not take these factors sufficiently into account when assigning students and teachers to classes. Most educational institutions do not maintain any records correlating student success with particular teachers, and even were they able to maintain such records, existing scheduling software, the rigid curriculum structure, and the large sizes of the classes make it difficult to use such information effectively for the benefit of the students and the teachers.

Because of their rigid structure, most traditional educational institutions do not allow for the possibility of students proceeding individually through the typical semester-long curriculum, e.g., at substantially varying rates. In high schools, for example, students are compelled to generally cover all the material designated as the minimum curricular content for each grade level. This may work reasonably well for the "average" student in a particular subject, but affords little room for accommodation both for the more intelligent and/or more motivated students on the one hand, and the slower and/or less motivated students on the other hand. All students, regardless of ability and motivation, are generally grouped together in classes of varying sizes, and are required to cover large quantities of curricular material at the same time and at the same pace. Although some schools group students into "tracks" ("more advanced" or "less advanced") for placement in classes, these groupings are generally fairly crude, and generally also comprise students having different skill and knowledge levels. As a consequence, the better students are often not able to reach their full learning potential, and the slower students are not accorded the special attention that they need.

The structure of traditional educational institutions has also contributed to the unhealthy phenomenon of "social promotions," especially in elementary and secondary schools, whereby students who have not mastered even the core curriculum of one grade level are allowed to "pass" and move on to the next higher grade level. This practice merely deepens the difficulties facing teachers who are compelled to teach large numbers of students grouped together in their classes having multiple skill and knowledge levels, and who are not capable of learning the same material at the same pace.

Social promotions occur even in educational institutions such as colleges, graduate schools, trade schools, university extension programs and job training classes, where grade levels per se are not used. Nevertheless, some general type of representation of a student's place or level in these schools or programs is often used, e.g., in a college the student may be described as a freshman, sophomore, junior or senior; in a medical or law school the student may be a 1st, 2nd, 3rd, or 4th year student; and in a certification program for professional training, the student's level may be described by how advanced a certificate he is trying to achieve and where he is in the program. The social promotions that occur in these institutions may not be as egregious as those in elementary or high schools, but are nevertheless quite prevalent—students continue to move upwards through the course of study with many specific gaps in their knowledge base. This occurs not only because students advance based upon an overall passing grade, but also because they may miss classes due to illness or other necessities of life, they may have poor rapport with a particular teacher, or they may fail to master material for a variety of other reasons. "Getting by" often becomes the norm, and even students who excel in general may not master key components of a specific course. (In general herein, the term "grade level" is intended to encompass any type of "educational level" such as described above.)

Various solutions have been proposed to rectify the numerous defects in the structure of traditional educational institutions. Chief among these has been to abandon or partially replace the traditional school/classroom structure in favor of individual instruction, made possible by the advent of the personal computer and the possibility of "computer assisted instruction." A vast industry has developed in recent years providing individualized computer-based courses of instruction in many different subjects, such as mathematics, foreign languages and the like. However, not all curricular subjects lend themselves well to this type of instructional format. In addition, individualized, computer-based instruction cannot provide important elements of the educational process which are provided by the traditional structure of educational institutions, not the least of which are the personal impact and role modeling of a really good teacher, and the socializing impact of the school room and the school campus. Moreover, for political, social and economic reasons, it is simply not possible to completely abandon the traditional educational structure based upon group learning in a classroom in favor of an educational process that is based totally on individual learning and computer-assisted instruction.

More recently, online "virtual classroom" education has become available, which utilizes email lists, high-speed video links and various interactive tools (such as having a class "vote" on a particular issue through a computer, or permitting a teacher to present and draw directly onto an electronic slide-show presentation). However, online classes are typically dependent upon access to computers with Internet connections (which sometimes must also be high-speed Internet connections) for each student. They are therefore relatively expensive, and require substantial infrastructure. For this reason, they are generally not available to populations in the third world and are still not universally available even in more developed countries. Online classes have other disadvantages, such as less direct personal contact with teachers, and, generally speaking, more limited socialization experiences with fellow students. Human person-to-person feedback is an essential part of the educational process, and even high-end online classes (which involve high-speed video links) cannot fully provide such feedback. Online education may try to emphasize human interaction through chat rooms and similar technologies, but cannot fully replace the pedagogical benefits of direct human contact.

Consortiums such as the IMS Project, or the Instructional Management Systems Learning Consortium, (www.imsproject.com) have been created for promoting common standards for distributing online learning activities, tracking learner progress, reporting learner performance, and exchanging student records between administrative systems. The learning management systems IMS supports are able to keep track of student education plans, schedule courses (including instructors and resources), enroll people in courses, record course results, and update student academic progress. Similarly, companies such as Saba (www.saba.com) and SmartForce (www.smartforce.com) offer products such as Saba's Learning Enterprise product and SmartForce's e-Learning platform, which are learning management systems that dynamically track and administer students' progress. These systems are focused most heavily on online learning and therefore have the limitations described above (e.g., high speed video online technology is generally limited to marketing to corporations because of its expense). Some of these learning management systems also promote instructor-based learning and mentoring. Other Web sites describing services for computer education and computer-facilitated education are www.blackboard.com, www.click2learn.com, www.intelliprep.com, and www.skillscape.com.

Various school administration software programs are commercially available, such as those marketed by SchedulExpert, Inc. (Ithaca, N.Y.), Rediker Software, Inc. (Hampden, Mass.), and Pentamation Enterprises, Inc. (Bethlehem, Pa.). According to the information displayed on the websites of these companies (www.schedulexpert.com; www.rediker.com; and www.pentamation.com), all of these programs, in one form or another, enable school administrators and teachers to maintain a computerized database of students, keep daily attendance records and records of grades, and produce report cards and various other reports. They also describe various scheduling tools.

ScheduleExpert is described as providing a tool for automated course scheduling in post-secondary educational institutions, being able to assign a course to a specific room, to one set of rooms, only to rooms that have particular features or attributes, or to rooms within a specific building or within a specified walking distance of the course's ideal location. ScheduleExpert is further described as being able to identify the schedule that best satisfies user-specified relative importance of six performance criteria, including avoiding conflicts of classes, ideal number of teaching days for faculty, preferred class times for faculty, faculty desire for consecutive classes, and minimizing distance from an ideal building.

Pentamation is described as an interactive software package designed to automatically schedule courses into class periods while assigning them to teachers and rooms based upon possible meeting codes and suitable allocation of resources.

Rediker is described as producing a schedule of classes either in an automatic mode or an interactive mode. The school administrator enters the courses taught in the school, the courses each student must take, the number of sections (up to three) any one course will have, optionally assigns a teacher to each section and optionally indicates any periods in which each section should not meet. In automatic mode, the program will tell the administrator when each section should meet so that there will be the fewest number of conflicts. In interactive mode, the program informs the administrator which periods would be best for a given course or section and when the teacher is available, the administrator selects the period, and then the program and the administrator proceed to select the other courses in turn.

Eagle Rock School and Professional Development Center in Estes Park, Colo. carries out several educational practices that exemplify a trend seen in a small number of schools across the country. As described by Lois E. Easton ("If Standards Are Absolute . . . ", Education Week, Apr. 12, 2000, pages 50, 52-53), these include the advancement of students based on competencies and not on grade level; varied student pathways through individualized learning plans; the possibility of a "class" taking place not only in the classroom, but at other sites such as a pharmacy or a fish pier; students traveling all over the world via the World Wide Web to get the information they need; different styles of learning for different students; and varying assessment techniques.

The book "Designs for Science Literary" by Project 2061 of the American Association for the Advancement of Science (F. James Rutherford, Director Emeritus, Project 2061), published by Oxford University Press, which is incorporated herein by reference, describes systems for flexible curricula assembly.

Kumon Math and Reading Centers are described on the World Wide Web (www.kumon.com) as providing a method of learning which includes individualized instruction in which a student advances according to individual ability rather than age or grade level, a curriculum in math and reading which presents concepts in small increments, and development of mastery of skills through repeated practice.

In an article entitled "New Features for Learning Management System," (ALN Magazine, Volume 3, Issue 2, December, 1999, www.aln.org), which is incorporated herein by reference, Bruce A. McHenry discusses spontaneous group formation of students and teachers to help them in online learning environments. McHenry writes: "Students' paths through the content, determined by their questions and satisfaction with the answers, will serve to identify cohorts of like minded students and the teachers that help them. These patterns of association will be also become factors for the Q&A finding function previously based on distance (feature 1) and semantics (feature 2). Perhaps more importantly, the associations will help to identify groups of individuals who can move through the material at about the same pace. On-line study sessions could then be scheduled in order to foster live group discussion and private conversations among these individuals."

U.S. Pat. No. 5,864,869 to Doak et al., describes a computerized method for use by teachers, for creating, editing and maintaining generic and subject-specific lesson plans, grade sheets and other information and reports. Teachers input in advance of the school term, which is up to a year in length, the total number of pages of text to be covered during the term in each subject they will be teaching. The software accesses pertinent information about the school calendar, and allocates the number of pages or percentages of the teaching tasks for each day. At the end of each week, the teachers input the number of text pages completed or the percentage of the tasks that were completed, and the computer prints out the next week's lesson plans, after reallocating the remaining pages of texts or tasks to fit the time remaining in the term for completion of the tasks.

U.S. Pat. No. 5,904,485 to Siefert, describes a system for computer-assisted instruction of a school's curriculum to individual students, enabling the students to learn the material at home. A learning profile is established and maintained for each student, which indicates the student's capabilities, preferred learning style, and standing. Based upon the profile, the software selects appropriate material for presentation to the student during each learning session. The program assesses whether the student has mastered the material. If he has not mastered the material, it is presented to him in a different way. If repeated different presentations of the material fail to instill mastery, a video conference is established between the student and a teacher.

Each of these patents is incorporated herein by reference.

SUMMARY OF THE INVENTION

It is a goal of some aspects of the present invention to solve many of the problems inherent in the structure of traditional educational institutions. Another goal of some aspects of the present invention is to enable traditional educational institutions to function better, optimizing both the teaching experience for the teachers and the learning environment for the students. Embodiments of the present invention achieve these goals by making it possible for traditional educational institutions to utilize all the resources at their disposal in an efficient manner, while eliminating many of the defects inherent in the rigid structure of these institutions.

In some preferred embodiments of the present invention, these goals are achieved by combining a sophisticated computer program for managing the various resources available in an educational institution with a modularized structuring of the curriculum taught in the educational institution. In accordance with these embodiments, the curriculum of the educational institution is defined on the basis of a relatively large number of discrete, typically small units of instruction or "modules," with the various modules inter-related one with another in a complex structure of dependencies. These dependencies may be limited to individual curricular subjects, but may also cross subject areas and thus be multidisciplinary in scope.

In an educational institution that utilizes a modular curriculum in accordance with a preferred embodiment of the present invention, students advance individually through the curriculum by attaining a demonstrated degree of competency in the subject matter of individual modules (or groups of modules), and not by the "completion" of entire subjects, grades, semesters, or calendar years. Since the curriculum is preferably based upon a relatively large number of modules which define a complex structure of dependencies, students advance through the curriculum along many different and discrete routes, each advance conditional upon attaining competency in the modules that are prerequisites of a subsequent module. And, although each student advances through the curriculum individually, the teaching of most of the curricular modules is group-based, in classes comprising only those students who are eligible to take the class, based upon their competency in the modules, which are prerequisites for the module being taught in that class.

The combination of a modularized curriculum and a sophisticated resource management program makes it possible to devise teaching schedules and schedules of classes that optimize various parameters which directly or indirectly affect the quality of the teaching and learning that takes place in the educational institution. Preferred embodiments of the present invention adapt software algorithms that are known in the art to optimize these parameters, within the constraint of generally only placing students in classes for which they have attained substantial competence in the subject matter of the modules which are prerequisites for the modules being taught in the classes, as described more fully herein below. By way of illustration and not limitation, typical parameters to be optimized may include: (a) class size; (b) expressed teacher preferences to teach particular curricular modules; (c) expressed student preferences for a particular module or a particular subject or a particular teacher; (d) data indicating the success of a particular teacher with respect to a particular student or a particular module; (e) geographical distance that must be traversed by students and teacher between successive classes; and (f) preferential scheduling of modules whose subject matter comprises the "core" of the curriculum.

Although a person skilled in the art will appreciate that there are many ways for generating a generally optimized schedule based on a set of constraints and a set of variables to be optimized, a simple embodiment of the present invention provides for a score to be given to each of these parameters, and for optimizing software to search through a large number of possible schedules for the entire school, in order to determine a set of class schedules which generate a maximum score.

According to a preferred implementation, the present invention will accomplish one or more of the following:

(1) It will improve the teaching and learning environment in the classes, by assuring that students of generally equivalent skill and knowledge levels are grouped together in the same class.

(2) It will enable teachers to emphasize core skills and knowledge, and to deepen the students' knowledge of these core areas as they progress through the various curricular levels, by providing greater review and more exposure to these core modules.

(3) It will result in a reduction of average class size.

(4) It will ensure that students master at least the most important, core parts of the curriculum, while minimizing gaps in their knowledge base.

(5) It will give teachers and/or students significant flexibility in choosing the subjects and/or topics they are interested in teaching and learning.

(6) It will make it possible for students to be assigned to classes with teachers or student-tutors with whom they have done well in the past, thereby increasing the likelihood of their obtaining maximum benefits from the classes.

(7) It will make it possible to utilize efficiently the skills of students as mentors and tutors of other students.

(8) It will allow students to proceed at their own pace.

(9) It will facilitate the integration of special education students within the traditional school structure and facilitate the training of teachers of special education students.

(10) It will end "social promotions."

(11) It will enable both the school and the students to cope better with absences due to ill health or other disruptions in the students' lives.

(12) It will limit the damage caused by less competent teachers, and maximize the exposure of students to teachers who perform well in particular modules, thereby increasing the overall average effectiveness of the teaching staff of the institution.

(13) It will facilitate the integration of non-native speaking students within the traditional school structure.

(14) It will make possible the extensive retraining of less competent teachers by more competent teachers as part of each teacher's schedule.

(15) It will make possible the customization of teaching, so that students will more often be able to be exposed to teaching in appropriate styles.

(16) It will make possible efficient sharing and mass implementation of proven pedagogical approaches through the use of curriculum and scheduling "templates."

(17) It will reduce overcrowding in educational institutions globally by making better use of all available educational resources.

(18) It will make possible the mass implementation of a small learning community model, whereby a large educational institution is broken down into many small mini-academies, and the curricular content, curricular emphases, scheduling priorities, tutoring approaches, and the amount and type of teacher and student choice for each academy are inputs to scheduling software.

(19) It will allow some students, e.g., students with disabilities, to be assigned personal scheduling priorities which are higher than the personal scheduling priorities of other students, so as to help these students advance academically by being preferentially placed in classes which are most suitable for them.

There is therefore provided, in accordance with a preferred embodiment of the present invention, a method for automatically producing a schedule of classes for an educational institution having a plurality of teachers, a plurality of students, and a curriculum, the method including:

receiving designations of a plurality of curriculum modules of the curriculum, each curriculum module including educational material, one or more of the curriculum modules being prerequisite modules for one or more subsequent modules;

receiving, as an input into a computer system, curriculum information including an indication of which of the modules are prerequisite modules for subsequent modules;

receiving, as an input into the computer system, student information including, for two or more of the plurality of students, indications of their levels of competence with respect to the educational material of one or more modules; and producing by the computer system a schedule of classes for teaching the educational material of at least some of the modules responsive to the curriculum information and the student information, wherein educational material to be taught in each of the scheduled classes includes the educational material of a respective one of the curriculum modules, and wherein the students assigned to each of the scheduled classes have attained at least a predetermined level of competence with respect to the educational material of the respective modules that are prerequisite modules for the module to be taught in the class.

Preferably, receiving the student information includes receiving an indication of prior success one or more of the students has had with one or more of the teachers.

For some applications, receiving the curriculum information includes receiving, for at least some of the curriculum modules, an age by which a student is expected to have achieved competency in the module. Alternatively or additionally, receiving the curriculum information includes receiving, for at least some of the curriculum modules, a link to one or more lesson plans for teaching the module. Further alternatively or additionally, receiving the curriculum information includes receiving, for at least some of the curriculum modules, one or more formats in which the module may be taught.

In a preferred embodiment, receiving the student information includes receiving, for at least one of the students, an indication of one or more languages understood by the student, and wherein producing the schedule includes producing the schedule responsive to the one or more languages.

In a preferred embodiment, producing the schedule includes:

determining that one of the students has attained at least a first level of mastery of a first one of the prerequisite modules;

determining that the one of the students has attained at least a second level of mastery of a second one of the prerequisite modules, the second level being different from the first level; and scheduling the one of the students to take a class responsive to the one of the students having attained the first and second levels of mastery in the first and second prerequisite modules, respectively.

Alternatively or additionally, producing the schedule includes designating a time period for assessing a level of mastery of one or more of the students in the educational material of a given module.

For some applications, producing the schedule includes receiving an input indicative of a desired percentage of students to be involved in tutoring sessions.

Typically, receiving the designations of the plurality of curriculum modules includes receiving, for at least some of the modules, an indication of the relative importance of the module to the curriculum, and wherein producing the schedule includes producing the schedule responsive to the indication of importance.

If appropriate, producing the schedule of classes includes determining when a student has failed to attain a desired level of mastery of a module and subsequently assigning the student to study the educational material in the module in a class configured to facilitate the student to attain the desired level of mastery.

Preferably, the method includes receiving, as an input into the computer system, teacher information including, for at least some of the plurality of teachers, an indication of a suitability of the teacher to teach one or more of the modules, wherein producing the schedule of classes includes producing the schedule of classes responsive to the teacher information. For example, receiving the teacher information may include receiving, for at least some of the plurality of teachers, an indication of a preference of the teacher to teach one or more of the modules. Alternatively or additionally, receiving the teacher information includes receiving, for at least some of the plurality of teachers, an indication of prior success the teacher has had in teaching one or more of the modules.

In a preferred embodiment, receiving the student information includes receiving, for at least one of the students, an indication of a learning disability of the student, and wherein producing the schedule includes producing the schedule responsive to the learning disability. In this case, receiving the teacher information preferably includes receiving an indication of one or more of the teachers who have specialized training to teach students with the learning disability, and wherein producing the schedule includes preferentially assigning the one or more of the teachers with the specialized training to teach a student with the learning disability.

In a preferred embodiment, producing the schedule includes determining an average of respective levels of mastery, achieved by at least one of the students assigned to the class, in the prerequisite modules for the module to be taught in the class. For example, determining the average may include determining a weighted average.

For some applications, producing the schedule includes designating at least one of the classes to have a single instructor and a single student. For example, designating may include designating one of the students to be the single instructor responsive to the student information received about the designated student. Alternatively or additionally, designating the one of the students to be the single instructor includes designating the one of the students responsive to a level of mastery of the designated student in a module to be taught by the designated student.

There is further provided, in accordance with a preferred embodiment of the present invention, a computer program product for automatically producing a schedule of classes for an educational institution having a plurality of teachers, a plurality of students, and a curriculum, the product including a computer-readable medium having program instructions embodied therein, which instructions, when read by a computer, cause the computer to:

receive designations of a plurality of curriculum modules of the curriculum, each curriculum module including educational material, one or more of the curriculum modules being prerequisite modules for one or more subsequent modules;

receive curriculum information including an indication of which of the modules are prerequisite modules for subsequent modules;

receive student information including, for one or more of the plurality of students, an indication of his level of competence with respect to the educational material of one or more modules; and produce a schedule of classes for teaching the educational material of at least some of the modules responsive to the curriculum information and the student information, wherein educational material to be taught in each of the scheduled classes includes the educational material of a respective one of the curriculum modules, and wherein the students assigned to each of the scheduled classes have attained at least a predetermined level of competence with respect to the educational material of the respective modules that are prerequisite modules for the module to be taught in the class.

There is still further provided, in accordance with a preferred embodiment of the present invention, apparatus for automatically scheduling classes for an educational institution having a plurality of teachers, a plurality of students, and a curriculum, the apparatus including:

a data port (13), adapted to receive designations of a plurality of curriculum modules of the curriculum, each curriculum module including educational material, to receive curriculum information, including designations of some of the curriculum modules as prerequisite modules and of some of the curriculum modules as subsequent modules, to receive, for at least one of the subsequent modules, a designation that one or more of the prerequisite modules are associated with the at least one subsequent module, such that participation by one of the students in the at least one subsequent module is dependent on the student having completed at least one of the one or more prerequisite modules associated with the at least one subsequent module, and to receive student information, including completion indicators for each prerequisite module, which completion indicators are indicative of students who have completed the prerequisite module; and a processor (12), adapted to receive the designations of the curriculum modules, to receive the curriculum information, to receive the designation for each subsequent module of the one or more prerequisite modules associated with the subsequent module, to receive the student information, and to automatically produce a schedule of classes for teaching at least some of the modules, such that each class includes at least one teacher and at least one student.

There is also provided, in accordance with a preferred embodiment of the present invention, a method for automatically producing a schedule of classes for an educational institution having a plurality of teachers, a plurality of students, and a curriculum, the method including:

receiving, as an input into a computer system, designations of a plurality of curriculum modules of the curriculum, each curriculum module including educational material;

receiving, as an input into the computer system, student information including for a first student, a second student, a third student, and a fourth student selected from the plurality of students, respective indications of their levels of competence with respect to the educational material of one or more modules;

scheduling a class to teach one of the modules, taught by one of the teachers, for the first student and the second student, responsive to the indications of the levels of competence of the first and second students; and scheduling a tutoring session to teach the one of the modules, in which the third student is designated to tutor the fourth student, responsive to the indications of the levels of competence of the third and fourth students.

In a preferred embodiment, receiving the student information includes receiving assessment data, with respect to the plurality of students, indicative of respective levels of competence of the plurality of students in the educational material of some of the modules, scheduling the class includes scheduling a plurality of classes to teach two or more of the modules of the curriculum responsive to the assessment data, and scheduling the tutoring session includes scheduling a plurality of tutoring sessions responsive to the assessment data.

There is additionally provided, in accordance with a preferred embodiment of the present invention, a method for automatically producing a schedule of classes for an educational institution having a plurality of teachers, a plurality of students, and a curriculum, the method including:

receiving, as an input into a computer system, designations of a plurality of curriculum modules of the curriculum, each curriculum module including educational material;

receiving, as an input into the computer system, student information including, for one or more of the plurality of students, an indication of his level of competence with respect to the educational material of one or more modules;

generating a first schedule of classes for the plurality of students, responsive to the student information, for teaching the educational material of some of the modules;

receiving, prior to completion of all of the classes in the first schedule, an assessment of levels of competence of some of the plurality of students in the educational material of the some of the modules; and generating a second schedule of classes for the plurality of students, different from the first schedule, responsive to the received assessment.

There is yet additionally provided, in accordance with a preferred embodiment of the present invention, a method for automatically producing a schedule of classes for an educational institution having a plurality of teachers, a plurality of students, and a curriculum, the method including:

receiving, as an input into a computer system, designations of a plurality of curriculum modules of the curriculum, each curriculum module including educational material;

receiving, as an input into the computer system, student information including, for one or more of the plurality of students, an indication of his level of competence with respect to the educational material of one or more modules;

receiving, as an input to the computer system, optimization parameters which are indicative of an educational focus of the educational institution;

executing an optimization algorithm responsive to the student information and the optimization parameters; and generating a schedule of classes responsive to executing the optimization algorithm.

In a preferred embodiment, receiving the optimization parameters includes receiving indications for at least two of the modules of their respective relative levels of importance within the curriculum.

Alternatively or additionally, receiving the optimization parameters includes receiving an indication of an amount of emphasis to place on scheduling one or more student-to-student tutoring sessions.

Further alternatively or additionally, receiving the optimization parameters includes receiving an indication of an amount of emphasis to place, when generating the schedule, on assessments of prior success of some of the students with some of the teachers.

Still further alternatively or additionally, receiving the optimization parameters includes receiving an indication of an amount of emphasis to place, when generating the schedule, on scheduling a student with a learning disability into a class with students without learning disabilities.

In a preferred embodiment, receiving the optimization parameters includes receiving an indication of an amount of emphasis to place, when generating the schedule, on scheduling a student having a first language as his primary language into a class with students having as their primary language a second language, different from the first language.

In a preferred embodiment, receiving the student information includes receiving an indication of a suitability of at least one of the students to be tutored. Alternatively or additionally, receiving the student information includes receiving an indication of a level of success that one of the students has had with one of the teachers.

For some applications, the method includes generating an electronic template including the optimization parameters, for transfer to another educational institution, to facilitate scheduling of classes at the other educational institution.

If appropriate, generating the schedule of classes includes designating one of the teachers to teach at least one of the classes, and assigning another one of the teachers to attend the at least one of the classes.

There is also provided, in accordance with a preferred embodiment of the present invention, a method for automatically producing a schedule of classes for an educational institution having a plurality of teachers, a plurality of students, and a curriculum, the method including:

receiving, as an input into a computer system, student information including respective personal scheduling priorities for each of the students; and generating a schedule of classes based on preferential treatment of some of the students responsive to their personal scheduling priorities.

BRIEF DESCRIPTION OF THE DRAWINGS

The present invention will be better understood and appreciated on the basis of the following detailed description in conjunction with the accompanying drawings in which.

DETAILED DESCRIPTION OF PREFERRED EMBODIMENTS

Figure 1:
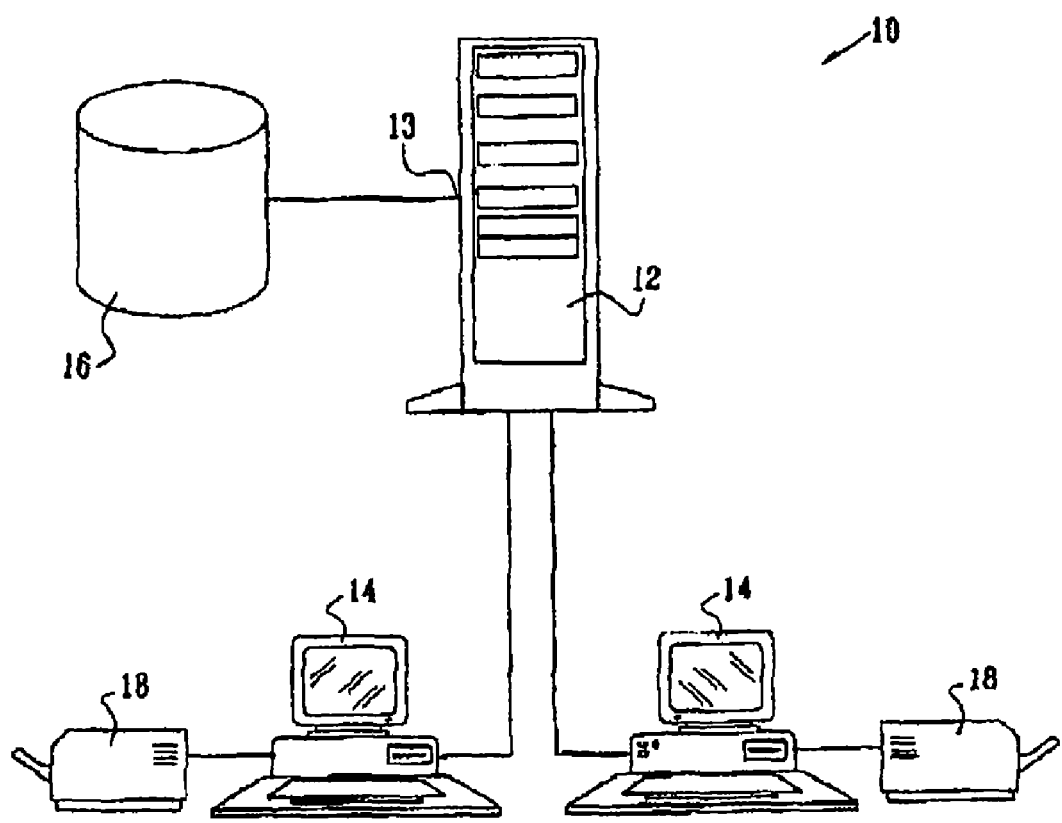
FIG. 1 is a simplified graphical representation of apparatus for implementation of a preferred embodiment of the present invention.

Reference is now made to FIG. 1, which provides a simplified graphical representation of apparatus for implementation of a preferred embodiment of the present invention. The apparatus of FIG. 1 comprises a computer network 10, including a data processing server 12 and one or more personal computers (PCs) or other computing devices 14. Server 12 comprises a data port 13, and associated with server 12 is a data storage device 16, which may be housed on server 12 or on a separate computer. Optionally associated with each of the one or more PCs 14 are one or more printers 18. All the components of network 10 may be physically installed and located within a single educational institution, and interconnected on a local area network (LAN). However, in a preferred embodiment of the invention, server 12 and data storage device 16 are not located within the educational institution itself, but at a distant location, while PCs 14 and printers 18 are located within the educational institution. Preferably, network 10 is Internet-based, with each of the network components interconnected via the Internet (or an Intranet network). It will be appreciated that when network 10 is Internet-based, PCs 14 and printers 18 may be located anywhere (such as at teachers' or students' homes), provided a connection to the Internet is available. Most preferably, access to server 12 is restricted, and the data thereon is password protected, available only to authorized individuals (such as the staff and administrators of the educational institution). When network 10 is Internet-based, user access is preferably by means of a Web browser on each of PCs 14; however, any other means of access via the Internet may be used. To ensure robustness and enhance security (either as a back-up or a distributed storage system), server 12 itself may comprise two or more servers associated with each other, either connected directly by cable or via the Internet or any other networking apparatus. Data storage device 16 may also be a network of data storage devices, a number of separate data storage devices, or any type of distributed database. Alternatively, in a simple form, network 10 may comprise a single computer located within the educational institution that combines the functions of server 12, data storage device 16, and PC 14.

Computer network 10 is preferably utilized in conventional ways, in combination with software developed in accordance with principles of the present invention, so as to input, store and maintain on data storage device 16 specific data pertaining to the curriculum, teachers and students of the educational institution (hereinafter collectively: "educational resource data"). In accordance with a preferred embodiment of the present invention, the software enables the administration of the educational institution to utilize the inputted and stored educational resource data so as to efficiently and effectively manage the day-to-day administration of the institution, including allocating students to classes, and producing teaching schedules for the teachers and class schedules for the students.

In accordance with a preferred embodiment of the present invention, the curriculum of the educational institution is defined by means of a relatively large number of curriculum modules, each module encompassing a relatively small, discrete unit of curricular material. Typically, the modules range in duration from two hours to 30 hours of instruction time, but may also be of shorter or longer duration. In certain subjects, such as the humanities and the social sciences, modules may be of longer average duration. It is noted that for educational institutions in which schedules must be assembled as seamlessly as possible, module durations are typically but not necessarily restricted to a relatively few number of durations, to make it easier to fit the schedules together as neatly as possible. For other applications, such as on-site job training, where the modules are taught as a small subset of a larger workday and therefore do not have to be fit together as seamlessly, permissible module durations may generally be more flexible. Similarly, online learning formats may permit more flexible durations as well, for some applications. The curricular modules are typically inter-related one with another in a complex structure of dependencies. These dependencies may be limited to individual curricular subjects, but may also cross subjects and be multidisciplinary in scope.

Figure 2:
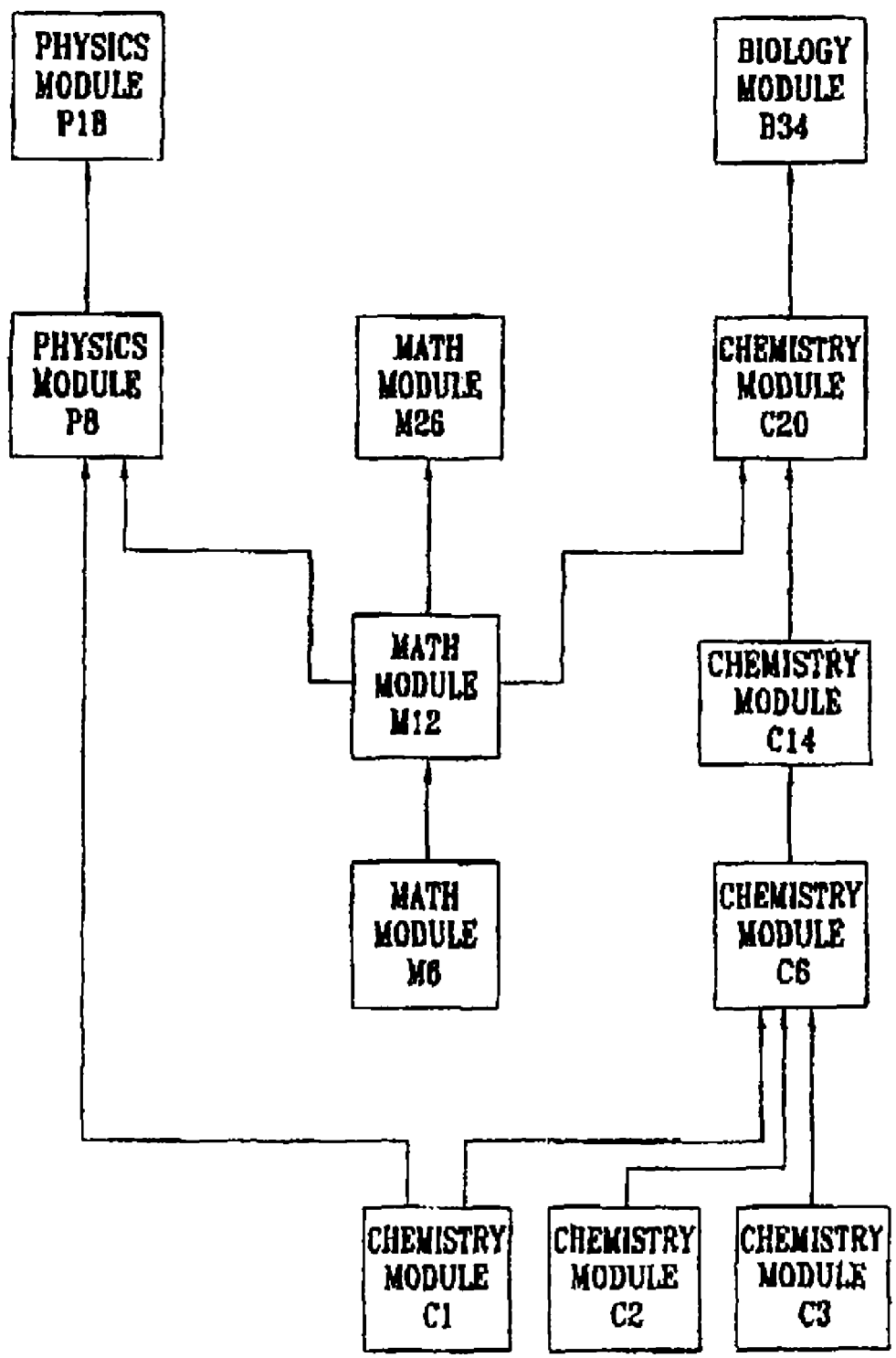
FIG. 2 is a simplified graphical representation of the dependency structure of curricular modules, in accordance with a preferred embodiment of the present invention.

Reference will now be made to FIG. 2, which provides a simplified graphical representation of the dependency structure of sample curricular modules, in accordance with a preferred embodiment of the present invention. It will be seen from FIG. 2 that the modules define a complex hierarchical structure, in the form of an acyclic directed graph, in which one or more of the "higher" modules are dependent on one or more of the "lower" modules. The dependencies may be "direct" or "distant." Thus, in FIG. 2—

Math Module M12 is directly dependent on Math Module M6;

Chemistry Module C6 is directly dependent on Chemistry Modules C1, C2 and C3;

Physics Module P8 is directly dependent on Math Module M12 and Chemistry Module C1;

Chemistry Module C20 is directly dependent both on Math Module M12 and on Chemistry Module C14, and it is also distantly dependent (at one level of distance) on Math Module M6 and on Chemistry Module C6; and Biology Module B34 is directly dependent on Chemistry Module C20 and it is distantly dependent both on Chemistry Module C14 and on Math Module M12 (as well as on the more distant modules on which these latter modules depend).

In the above dependency structure, for example, the topic of Chemistry Module C20 may be "Balancing chemical equations," and this module is dependent both on Math Module M12 ("Basic algebraic skills") and on Chemistry Module C14 ("The periodic table"), since a student must know both basic algebra and the elements of the periodic table in order to learn how to balance chemical equations.

It will be appreciated that FIG. 2 provides only a very partial representation of the complex dependency structure of the curricular modules of an educational institution, in accordance with a preferred embodiment of the present invention. Thus, for example, Math Module M6 is directly and distantly dependent on one or more "lower" modules which are not shown, and there are also modules "higher" than Physics Module P18 and Biology Module B34 which are not shown, but nevertheless depend directly and distantly on either or both of these and/or on other modules not shown. In addition, certain modules (not shown in FIG. 2) may be directly dependent on two or more other modules in the alternative, rather than cumulatively; for example, a module whose subject matter is "Introduction to Linguistics," may depend either on a module whose subject matter is "French Syntax" or on a module whose subject matter is "Spanish Syntax."

The number of curricular modules comprising the curriculum of an educational institution will vary from institution to institution, and will also vary over time within any given institution, as the teachers develop new curricular material or redefine the structure of the curriculum. As an example, in a typical high school there are generally more than 300 curricular modules comprising the curriculum of grades 9-12. In a typical university, there would be a much greater number of modules (e.g., thousands), although students would only traverse through a small number of these during their university career. In some educational institutions (such as high schools), additional modules comprising remedial content may be included with the standard curricular modules. In high schools, for example, these would include modules covering topics typically studied in the lower grades, and in colleges, these would include modules typically studied in high schools.

The large number of curricular modules, in combination with the complex structure of interdependencies, make it possible for students to advance through the curriculum of the educational institution in diverse ways, with each student potentially defining his own individual pathway through the curriculum. In the representation of curricular modules in FIG. 2, for example, students who have completed Math Module M12 have three possible pathways open to them: (1) advancing to Math Module M26; (2) advancing to Physics Module P8; and (3) advancing to Chemistry Module C20 (the latter option is available only to those students who have also completed Chemistry Module C14). Some students may advance to all three of these modules in parallel; others may do so in sequence; and still others may never advance to one or another of the modules, depending upon their individual programs of study.

In accordance with a preferred embodiment of the present invention, the students of an educational institution in which the principles of the present invention are implemented advance from one module to another only when they are eligible to do so. "Eligibility," in this regard, is preferably defined by the administration and/or teachers of the educational institution by means of a two-tiered set of rules which establish (a) which modules are "prerequisites" for other modules, and (b) what level of competency must be attained by the students in the subject matter of the prerequisite modules before they are eligible to advance to the "higher" modules for which the lower modules are prerequisites.

In general, a "prerequisite" of a module is every other module on which the module is directly dependent. However, an educational institution may determine that one or more distant modules or levels of modules are also to be considered "prerequisites" for the modules that depend on them. This may be a general rule for all the modules taught in the educational institution, or a more limited rule either for modules of certain subjects only or for certain modules specifically identified. As an example, with reference to FIG. 2, Math Module M12 and Chemistry Module C14 is each a "prerequisite" of Chemistry Module C20. However, an educational institution may decide that Math Module M6 and Chemistry Module C6 are also "prerequisites" of Chemistry Module C20.

Alternatively, the educational institution may establish a rule that all modules that are one, two, or more dependency levels below a given module are considered its prerequisites.

The educational institution also preferably determines the level of competency that must be attained by students in the subject matter of the prerequisite modules. In general, this should be a relatively high level, as evidenced by the students obtaining at least a specific threshold grade in an assessment of the subject matter of each of the prerequisite modules. However, the rules in this regard may be quite flexible. Thus, the educational institution may determine different threshold grades with respect to different prerequisite modules, or it may determine one threshold grade for all modules in one subject area, and a different threshold grade for all modules in other subject areas. For example, an educational institution that focuses on math and science may set a higher threshold grade for all math and science modules and a lower threshold grade for all modules in the humanities. In some circumstances, the educational institution may establish a different threshold grade in certain modules for certain categories of students (such as learning disabled students). For example, in certain circumstances, the educational institution may establish a different threshold grade (required assessment level to complete a module) in certain modules for certain classes of students or individual students. This could, for example, be a strategy for assuring that certain categories of students graduate on time, if they are having problems in a particular subject (such as a learning disabled student whose impairment made a certain subject particularly difficult). Alternatively, students majoring in a particular topic may have a higher threshold passing grade for a given module than students who are not majoring in that topic. Preferably, therefore, the scheduling algorithm is operative to schedule students to retake a given module, if appropriate, responsive to the particular passing threshold set for each student in that module.

In a preferred embodiment of the present invention, a student satisfies the level of competency requirement for certain modules simply by attending a class or activity. For example, some classes may have a community service component associated therewith, for which attendance alone is required.

The educational institution may also implement some type of "weighted average grade" across a set of prerequisite modules. In this case, certain modules are deemed more relevant and therefore accorded a "heavier" weight than other modules deemed less relevant, which are accorded a "lighter" weight. A student would be deemed eligible for a class in a "higher" module if his weighted average grade across all the prerequisite modules passes a predetermined threshold, even if he has not yet achieved the specific threshold grade which is required for one or more of the individual prerequisite modules. Using such a rule, a student could become eligible for a class in a "higher" module, but still be required to complete the prerequisite modules in which he has not achieved the specific threshold grade required for those modules.

The assessment of the students' level of competency may be based on any method that is pedagogically sound, including the results of written or oral tests, "portfolios" of student work (either individually based or group based, or both), and the like. If assessments are group based (such as a group project), teachers may decide whether to give each student in the group the same assessment, or whether to include some individualization of the assessment, e.g., by including a one-on-one interview component for the project assessment. In some circumstances, for example upon the initial implementation of the present invention in an educational institution, some of the assessments may not be based upon testing or project work, but upon the reasoned evaluation of a teacher who is familiar with the student and his abilities. In the event that actual student assessment information is lacking or is not available, for a particular module or in general, presumed or temporary assessments may be provided. Such assessments preferably would be coded as such, and provision made for obtaining actual assessments at a later date. Given that prior assessment information is likely to be based upon entire semesters or quarters of work, all of the modules that comprise a course already taken may be coded at the same level of the course, as a temporary measure until better assessments have been performed, or even permanently if the modules are deemed less central.

The information concerning the modules which comprise the curriculum of the educational institution is preferably stored on data storage device 16 in a format that makes it possible to quickly and readily access the information. This may take the form of a database table, a suitably formatted file, a system of software objects, or any other data format as is known in the art. The information that is stored typically comprises one or more identifiers, which identify each of the curricular modules and the module or modules on which each module directly depends. Additional information may also be associated or linked with the identifier of each module, such as the subject category of the module, the age by which a student is expected to have achieved competency in the module, a textual and/or graphical description of the module, lesson plans for teaching the module, references to the textbooks being used, including chapters and page numbers, special equipment needed to teach the modules, and one or more formats in which the module may be taught, such as an on-line class, a traditional classroom class, etc.

In a similar fashion, data storage device 16 is preferably utilized to store information concerning the students enrolled in the educational institution. The student information that is stored typically comprises one or more identifiers identifying each student, and, when known, his level of competency with respect to the subject matter of each of the modules. Additional information may be associated or linked with the basic student information, such as biographical data, learning disabilities, primary and secondary languages spoken, medical needs, or other pertinent data.

Although each student preferably advances through the curriculum on an individual basis (as explained above), the teaching in the educational institutions in which the present invention is implemented is typically group-based, as it is in traditional educational institutions. However, the groups or classes of students are generally not defined by the age of the students or by "grade" level, as is commonly practiced in most schools, but rather by the curricular modules and the level of competency of the students assigned to the classes. In institutions utilizing principles of the present invention, the software preferably is operative to select and group together in each of the classes only those students who are in fact "eligible" for the classes, based upon the students' levels of competency in the modules which are prerequisite modules for the module being taught in the class. As a consequence of this selection process, all or most of the students in each class will have equivalent or nearly equivalent skill and knowledge levels with respect to the topic being taught in the class, and the quality of the teaching and the learning in the classes will therefore be greatly enhanced.

In accordance with a preferred embodiment of the present invention, data storage device 16 is also utilized to store information concerning the teaching staff of the educational institution. The teacher information that is stored comprises one or more identifiers identifying each teacher and his "level of readiness" to teach each of the modules. Preferably, "level of readiness" provides a weighted measure not only of the teacher's formal qualifications to teach the subject matter of the module, but also of one or more additional factors that impact upon the quality of his teaching. Such factors may include the degree of the teacher's interest in teaching the module (as compared to other modules he is also formally qualified to teach), the success he has had in the past teaching the module, and the like. In accordance with a preferred embodiment, the software is operative to assign teachers to classes in the various modules based upon the teachers' levels of readiness, so that in general only teachers with a relatively high level of readiness will be assigned to teach each of the classes.

Figure 3:
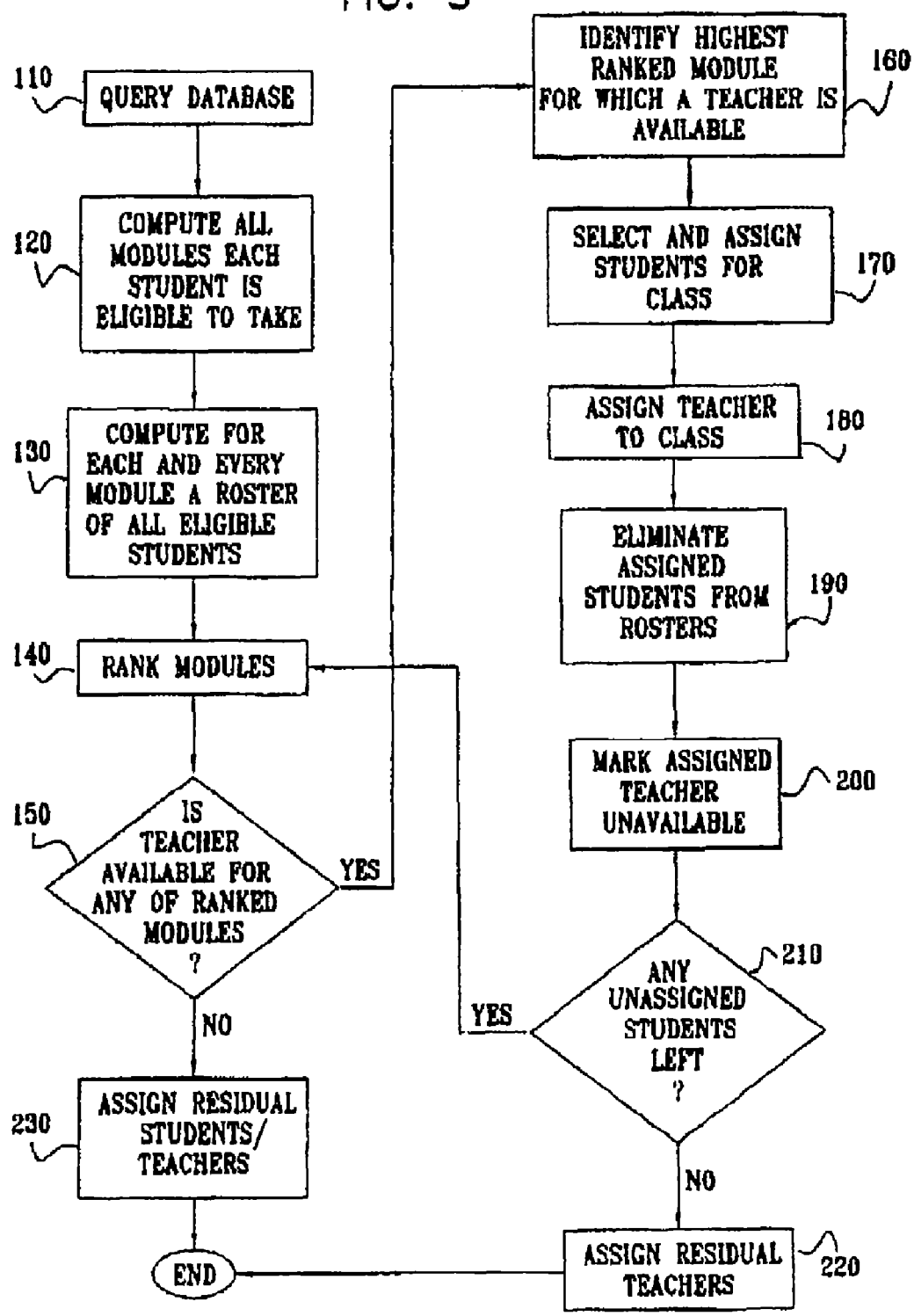
FIG. 3 is a simplified flow-chart showing one set of procedures for selecting and assigning students and teachers into classes, in accordance with a preferred embodiment of the present invention.

Reference is now made to FIG. 3, which is a simplified flow-chart of basic procedures that may be utilized to assign students and teachers to classes, in accordance with one embodiment of the present invention. It will be appreciated that the method shown in FIG. 3 and described in the text is just one of many ways to implement the invention as disclosed herein.

Procedure 110: The program accesses the educational resource data stored on data storage device 16, including the curriculum information, the teacher information, and the student information.

Procedure 120: The program computes, for each student, the set of modules he is eligible to take, based upon (a) the set of curricular modules he has already taken, and assessments he has received in those modules; (b) the dependency relationship of the modules; (c) the rules concerning which modules are prerequisites of other modules, and what level of competency is needed for advancement to a higher module; and (d) the student's competency level in the subject matter of the prerequisite modules. Additional factors may impact upon the number of modules included in a student's set of eligible modules; for example, if a student has elected not to take certain subjects which are offered as part of the curriculum of the educational institution, the modules pertaining to these subjects will not be included in the student's list of eligible modules, even though he may in fact be eligible to take classes in these modules.

Procedure 130: The program computes, for each module, a roster of the students who are eligible to take a class in the module, based upon the results of Procedure 120.

Procedure 140: The program sorts the rosters of students obtained in accordance with Procedure 130 by one or more sort orders and ranks them accordingly. The sort order may be based on size (the number of students on each roster), the need to have a minimum number of students in each class (both now and in the rest of the school year), on the relative "weight" or importance of the modules within the overall curriculum of the educational institution, on the weighted preferences of the teachers or students to teach or study the modules, or any combination of these, as determined by the educational institution.

Procedure 150: The program checks for the availability of a teacher to teach any of the modules ranked in accordance with Procedure 140. If a teacher is available, the program proceeds to Procedure 160. If a teacher is not available, which typically may occur after many iterations of these procedures as more fully explained below, the program proceeds to Procedure 230.

Procedure 160: The program identifies the highest ranked module for which a teacher is available and selects this module for scheduling a class.

Procedure 170: The program selects, from the roster of students of the module selected in accordance with Procedure 160, a predetermined number of students and assigns them to a class in the subject matter of the module. The number of students selected for the class will be based upon a range of factors as determined by the administration of the educational institution, such as classroom size, subject matter of the module, and the like. Which students are selected from the eligible students will also be based upon a range of factors, such as the age of the students, the presence of students requiring special attention, the weighted preferences of the students for the subject matter of the module, and the like.

Procedure 180: The program assigns the available teacher to the class. If multiple teachers are available to teach the class, the program chooses the teacher based on a range of factors, such as teacher preference for teaching the modules, past performance of the available teachers with the students in the class, and the like.

Procedure 190: The program marks the students assigned to the class as not eligible to subsequently take the module, and eliminates them from the rosters calculated according to Procedure 130. These modified rosters are used in subsequent iterations of Procedure 140.

Procedure 200: The program marks the teacher who has been assigned to the class as not being available to teach.

Procedure 210: The program checks whether or not there are any students who have not yet been assigned to a class. If there are no students who have not been assigned to a class, the program proceeds to Procedure 220. If there are students who have not been assigned to a class, the program proceeds to Procedure 140 and schedules another class if possible by repeating Procedures 140, 150, 160, 170, 180, 190 and 200.

Procedure 220: After all students have been assigned to classes, the program assigns any residual teachers, if there are any, to one or more non-classroom activities.

Procedure 230: If there are no teachers available for any of the ranked modules, which typically will occur after repeated iterations of the above procedures, the program assigns any residual students/teachers to a non-classroom activity such as a study hall, a library session or the like.

Figure 4:
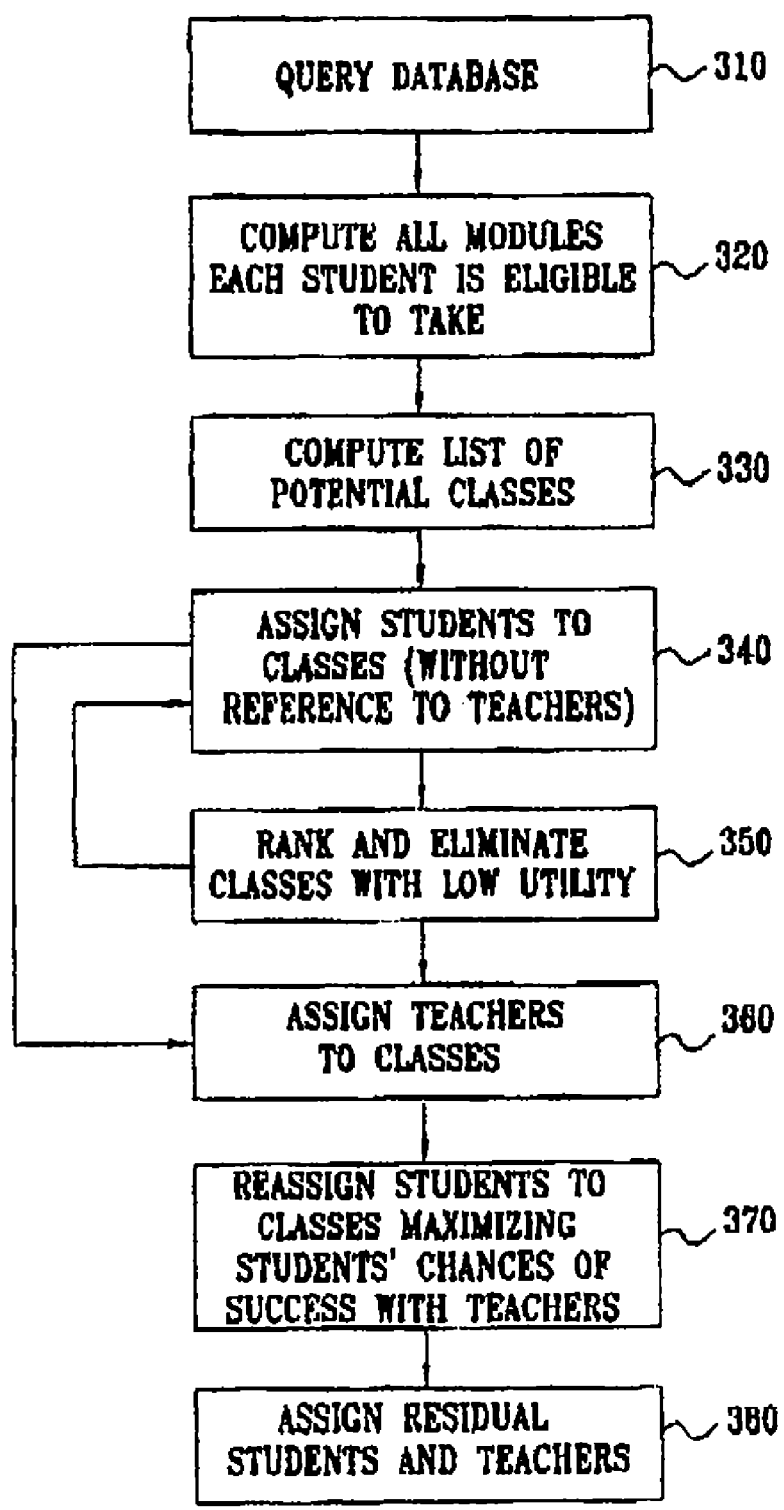
FIG. 4 is a simplified flow-chart showing another set of procedures for selecting and assigning students and teachers into classes, in accordance with a preferred embodiment of the present invention.

Reference is now made to FIG. 4, which is a simplified flow-chart of basic procedures that may be utilized to assign students and teachers to classes, in accordance with another embodiment of the present invention. It will be appreciated that the method shown in FIG. 4 and described in the text is just one of many ways to implement the invention as disclosed herein.

Procedure 310: The program accesses the educational resource data stored on data storage device 16, including the curriculum information, the teacher information, and the student information.

Procedure 320: The program computes, for each student, the set of modules he is eligible to take, based upon (a) the set of curricular modules he has already taken, and assessments he has received in these modules; (b) the dependency relationship of the modules; (c) the rules concerning which modules are prerequisites of other modules, and what level of competency is needed for advancement to a higher module; and (d) the student's competency level in the subject matter of the prerequisite modules. Additional factors may impact upon the number of modules included in a student's set of eligible modules; for example, if a student has elected not to take certain subjects which are offered as part of the curriculum of the educational institution, the modules pertaining to these subjects will not be included in the student's list of eligible modules, even though he may in fact be eligible to take classes in these modules.

Procedure 330: The program creates a list of potential classes, based upon the results of Procedure 320, creating a class for each module for which there is at least a predetermined minimum number of eligible students. In the event the number of students eligible for a class in a module is greater than the maximum permitted class size, the program may compute the number of parallel classes needed to accommodate all the students and add these to the list of potential classes.

Procedure 340: The program makes an assignment of students to the classes on the list of classes based upon an assignment algorithm which maximizes an overall objective function with respect to the modules and the students of the educational institution. The selection of classes from among the list of classes and the selection of students from among those eligible for a class is based upon one or more weighted parameters, as more fully described herein below, such as the relative importance of the module within the framework of the curriculum of the educational institution, the students' weighted "preference" for specific modules from among a choice of modules, and the like. In this initial assignment, the program is operative to assign each student to a single class, without any constraint being imposed with regard to the number of teachers available. At the conclusion of this procedure, the number of classes to which students have been assigned typically will be very much larger than the number of teachers available to teach at any one time. In the event multiple parallel classes for a single module were created in Procedure 330, students typically will be assigned so as to fill each class in turn; however, under certain circumstances, several of the classes may only be partially filled.

Procedure 350: The classes to which students have been assigned in accordance with Procedure 340 are ranked on the basis of their contribution ("utility") to the overall objective function. A fraction of those with the lowest utility are eliminated, subject to override based upon specific needs of the students or the educational institution. For example, a class with less than the minimum number of students would not be eliminated if it were absolutely essential for the students who were assigned to the class to take the class at that time. Similarly, a predetermined number of classes from each subject category would not be eliminated, so as to maintain a distribution of classes across the various subject categories.

The program repeats Procedure 340, reassigning the students and redistributing them among the classes remaining after the elimination of the fraction of low utility classes in accordance with Procedure 350. If the number of classes is equal to or less than the number of available teachers, the program continues with Procedure 360; otherwise, the program repeats Procedure 350, again eliminating a fraction of those with the lowest utility. The loop ends when the number of classes to which the students are assigned is equal to or less than the number of available teachers.

Procedure 360: The program assigns the available teachers to the classes to which students have been assigned at the conclusion of one or more iterations of Procedure 340, based upon an assignment algorithm for the teachers which maximizes an overall objective function with respect to the modules of the selected classes and the students assigned to the classes. The assignment of the teachers is based upon the teachers' degree of readiness to teach a class in each of the modules (as explained above) and one or more additional weighted parameters, more fully described herein below, such as the expected performance of the group of students who have been assigned to each class with the assigned teacher, in view of the combined past performance of the students with the teacher.

Procedure 370: The program reassigns and redistributes the students among the classes to which teachers have been assigned, utilizing a refined utility function for each student based upon not only the criteria of Procedure 340 but also upon the student's expected performance with the teacher assigned to the class. This has the effect of redistributing the students among the classes to which teachers have been assigned in a manner that maximizes the students' chances of success with the teachers. In the event that, at the end of Procedure 360, no teacher has been assigned to a class to which students have been assigned during the last iteration of Procedure 340, the class is eliminated prior to the execution of Procedure 370, and Procedure 370 is executed only with reference to the classes to which teachers have been assigned.

Procedure 380: In the event that, at the conclusion of Procedure 370, one or more teachers have not been assigned to classes, or one or more students have not been assigned to a class, the program will typically assign such students to an alternative activity, such as study hall, and may assign such teachers to a non-classroom activity, such as tutoring, study hall supervision and the like.

It will be appreciated that the procedures set forth above with reference to FIGS. 3 and 4 may be invoked not only to selectively assign students and teachers to classes, but also to produce a schedule of the classes being taught in the educational institution. In this embodiment of the invention, the software program is operative to repeatedly select and assign students and teachers to classes, and to do so as many times as needed, so as to cover any predetermined period of time, such as a full school day, several weeks, or longer.

The basic procedures for assigning students and teachers to classes over extended periods of time are similar to those outlined with reference to FIG. 3 and FIG. 4, but include adaptations and additions which are necessary or desired to take into account the element of time that is an essential feature of such a scheduling program. Thus, after all the students have been assigned to classes, in accordance with the procedures of FIG. 3 or FIG. 4, these classes would be scheduled for the first period of the school day. The program would then be operative to start the selection and assignment process again, after eliminating the module to which each student has been assigned from the student's list of eligible modules. (If, after a student has completed all classes in the module, he is found not to have achieved the minimum competency level required for the module, the module would once again be included in the student's list of eligible modules.) This same limitation would not apply to the teachers, since there is nothing wrong with the same teacher teaching the same module to different students even several times a day (although some limitation to prevent "burn-out" could be implemented in an embodiment of the invention). The process of selection and assignment to classes is repeated until all class periods for a given day are scheduled, and a similar process is carried out for each day of a predetermined number of days. Preferably, due to the dynamic nature of the scheduling process, the advance scheduling is done for relatively short periods of time, for as many weeks or months in advance as are needed to give the teachers time to prepare and the students time to get the necessary class materials, etc. However, the scheduling may also be done for shorter periods of time, such as days, or longer periods of time, such as a half-year or greater.

In a preferred embodiment of the invention, in cases where scheduling is done for a period of time that includes multiple consecutive modules (such as a 3-month period which features several sets of consecutive 1-month modules), the schedule may be generated a few months out and then revised as new information comes in regarding student success or failure in the earlier set of modules. In this case students and teachers would be given their schedules for several months out, but then given revised schedules in the case of changes.

In a preferred embodiment of the invention, the scheduler may also be operative to assign assessment tasks to teachers. So, for example, an educational institution may have as a general default that all teachers do all assessments for their own classes. Alternatively, the teachers within a given teaching department may rotate grading or conducting assessments amongst themselves for each other's classes in order to help produce a more transparent and standardized assessment within the educational institution. Alternatively a certain amount of rotation and a certain amount of grading one's own classes could be used. Third party assessments (such as state assessment exams or assessments provided by private companies) may also be used to provide greater standardization, as appropriate.

The schedule of classes produced in accordance with the present invention may be articulated in various ways. The simplest is a daily listing in terms of "class periods," for example, 1st period, 2nd period, etc. In a more complex version, the schedule provides actual time slots for each of the classes, indicating start time and/or end time, as required by the administration of the educational institution. Preferably, the schedule also indicates the classroom number for each of the classes, based upon the information inputted into data storage device 16 with regard to the physical facilities of the educational institution, including the maximum number of students that can be accommodated in each of the classrooms, and special features that may be contained or associated with any of the classrooms (such as a laboratory, a screening room, etc.). Further preferably, the schedule is optimized with respect to these parameters, and/or with respect to one or more of the other parameters described herein, and/or with respect to parameters which would be deemed suitable for optimization by a person of ordinary skilled in the art upon reading this description.

In addition to producing a schedule of classes for the educational institution as a whole, the program preferably produces individual schedules, providing each teacher with a schedule of the classes he is expected to teach, and each student with a schedule of the classes he is expected to attend.

In accordance with a preferred embodiment, which would be particularly useful for an educational institution having a large campus and many classroom buildings, the database would also include information about the relative distances between the various classrooms, and the scheduling program would take this information into account when assigning teachers and students to classes, so as to minimize the distances teachers and students would have to traverse when moving from class to class.

The proper implementation of some embodiments of the present invention utilizes information reflective of assessments of the students' competency levels in the various curriculum modules. Such assessments preferably are inputted into the database by the teachers or by the school administration on an ongoing basis, and are immediately available for utilization by the software for purposes of future scheduling of classes.

In a preferred embodiment, the program is also operative to include "assessments" as part of the scheduling process. For example, for modules of relatively brief duration, the program would be operative to automatically schedule a period of predetermined length, dedicated to the assessment of the students, at a predetermined period of time after completion of all classes in the subject matter of the module. Such an assessment period may be scheduled for the students who have completed a specific module, or for a larger group, comprising students from several modules each of whom will be assessed on the subject matter of the specific module he has completed. In some cases, the assessment of the students may occur within the time slots allocated for teaching the module, and no specific assessment period would then be scheduled.

The information concerning the various possible forms of assessment may be associated with the basic information for each module, or may be associated with the basic information for each teacher. The latter arrangement would allow each teacher the freedom to decide which type of assessment technique to employ, including when the students should be assessed, whether they should be assessed individually or in groups, whether the groups should include only the students of the module or also students of additional modules, the duration of the assessment period, and the range of time, if any, that should intervene between the completion of the teaching of the module and the assessment period.

The results of assessments are preferably inputted into the database on an ongoing basis, and are then available for use by the program for purposes of scheduling new classes. The inputting may be manual, but if the assessment mechanism is computer-based and graded, then the input may be automatic.

In accordance with a preferred embodiment of the present invention, students may repeat a module several times on their way to achieving the necessary level of competency. Preferably each time a student repeats a module, he will be given more attention to assist in achieving the necessary level of competency. For example, he may be assigned to a smaller class, he may be given a more competent teacher in the module, or he may be assigned a tutor to assist him.

In accordance with a preferred embodiment of the present invention, and as elaborated in several examples herein below, the administration and/or teachers of an educational institution may assign different "weighted values" to the various modules, certain modules being deemed "heavier" and others deemed "lighter." (This weighting of the modules is distinct from the weighting of modules in their role as prerequisites for other modules, as described above.) The modules accorded a heavier weight are typically those that comprise the "core" of the curriculum. The weighted values assigned to the various modules are then utilized by the program as a factor in the process of selecting students and assigning them to classes. Modules that have been assigned a higher weighted value, because they comprise the core of the curriculum, will be accorded greater emphasis and priority.

In certain circumstances, for example in colleges, the weighting of certain modules may vary as a function of the student populations that will be assigned to classes in the modules. For example, one or more math modules, which are, required both for chemistry majors and for math majors may have one weight (or a range of weights) for the chemistry majors and a different weight (or range of weights) for the math majors.

The weighting of the modules may have additional application for the scheduling process. For example, the educational institution may decide that the students in the school are required to repeat one or more times classes in the core modules (even though they have achieved competency in the module), and the program would then be operative to schedule students for such repeat classes at certain intervals. In addition, the various core modules may have associated with them several different teaching and assessment methods, such that for each repetition of the module, students will be exposed to a different teaching and/or assessment method. For example, a module may first be taught in a standard lecture format with the assessment in the form of a multiple-choice quiz, and when repeated it would be taught in the form of a hands-on activity with a written project as the assessment method.

The weighting of the modules can also be used for purposes of preferential assignment of teachers to teach the modules. For example, in the assignment of teachers for core modules, the teachers who have a higher competency level than other qualified teachers would be selected first as teachers of the core modules.

The weighting of the modules may also be utilized as a basis for the timing and scheduling of assessments. For example, the educational institution may decide that students should be repetitively assessed in the subject matter of the core modules, and the program would be operative to schedule assessment periods for these modules at appropriate times and intervals.

In accordance with a preferred embodiment of the invention, the students of an educational institution would also be able to indicate their weighted preferences for certain aspects of the curriculum, and this information would be utilized by the scheduling program for preferential assignment of the students to classes. In one application of this concept, the students would indicate their preferences with respect to various curricular subjects or categories (not individual modules), providing an indication that they prefer to spend more time learning certain subjects than others. In such an event, the scheduling program would maximize the assignment of students to classes in modules that fall within these curricular subjects or categories. In another application, the students would be able to access the list of modules for which they were eligible, and input a weight for each of them. The scheduling program would utilize this information in maximizing the objective function for assigning the students to classes, as explained above. In general, however, a student's preferences would not be taken into account if he failed to achieve competency in one or more modules and the differential between his actual age and the standard age at which competency in the modules was expected to have been achieved exceeded a predetermined maximum. In such an event, the student would typically be assigned to classes in these modules regardless of his preferences.

In accordance with a preferred embodiment of the present invention, the teachers of an educational institution may be accorded the option of determining one or more parameters that have pedagogical significance for the modules that they teach. For example, different teachers may prefer to have different amounts of time to teach the same module. In such a case, teachers who prefer more or less teaching time than the standard would be able to indicate the duration they need. Another example would be special equipment or special teaching conditions, such as a biology teacher determining that a particular module on ecology should be taught on a riverbank rather than in a classroom. The teacher would input this special requirement, and the program would be operative to schedule that meeting place for the class, rather than a classroom.

In accordance with a preferred embodiment of the invention, the teachers of an educational institution may combine one or more modules into a single "super-module." This would be particularly useful for purposes of teaching an interdisciplinary project, involving several topics which may not be inter-related on the basis of the normal dependency structure of the curricular modules. However, it could also be used for other purposes, such as to assure that a sequence of several modules within the same subject be taught as a unit, rather than as individual modules spread out over an unknown period of time. The combining of several modules into a single "super-module" preferably is temporary, and the definitions of the individual modules remain intact. Students would be eligible to take a "super-module" only if they have fulfilled the prerequisites for all of the modules involved. The flexible use of "super-modules" can be a powerful tool for teachers in developing new and innovative approaches to the teaching of various topics, without necessitating a restructuring of the curriculum as a whole. For example, a super-module entitled "Solar Energy as an Alternative Source of Power" may combine modules from biology, chemistry, and physics.

A preferred embodiment of the invention will schedule several months in advance, so that teachers will have adequate time to prepare classes. In cases where the invention schedules in advance two or more consecutive modules at a time, the invention may be operative to force modules in a given sequence to be offered consecutively, even though prior modules have not yet been assessed as mastered. So, for example, the math department may prefer to promote a particular pathway through the math curriculum that consists of modules M35, M36, and M37, because these modules are highly related and teachers prefer that they be taught consecutively. If the staff wanted to force the modules to be taught together in consecutive order regardless of how students do in the earlier module(s) (M35, M36), they could create a super-module out of modules M34, M35, and M36, and all three would be generally guaranteed to be taught in one sequence with no gaps of time in between.

However, if the staff wished only to typically keep these three modules in consecutive order (with no significant gaps therebetween in students' schedules), but also wished to permit the modules to be repeated (prior to continuing the sequence) should students not do well enough in the earlier modules, the staff could preferably so indicate. The scheduler would then be operative to schedule the modules for students in consecutive order in advance, but would also be operative to subsequently reschedule students out of the sequence (or into repetition of earlier modules and back into the sequence) should the students not pass the earlier modules.

In one preferred embodiment of the invention, the program would by default schedule students in consecutive modules and then reschedule students who fail to pass earlier modules in the sequence. In another embodiment of the invention, the program would allow teaching staff to indicate that they wished certain consecutive modules to be scheduled in sequence without significant gaps in time therebetween, or else the program would naturally put gaps between the consecutive modules to make sure students had been assessed and had passed previous modules in a sequence before being placed in subsequent modules.

In a preferred embodiment of the invention, teaching staff would indicate which module sequences should preferably be given in consecutive order (without gaps in time between them), and the scheduler would be operative to prioritize scheduling those modules consecutively in advance, and to reschedule them when necessary. Alternatively or additionally, the scheduling algorithms could be biased towards putting modules consecutively for certain sequences of modules, in accordance with indicated choices of teaching staff. Teaching staff could indicate through "connection strengths" between modules how important it is to place them consecutively, and the scheduler could be operative to focus on consecutive placement of modules with the greatest connection strengths between them, wherever possible. For example, a connection strength could be represented as a number between 0 and 100, where 0 would indicate no necessity to put two modules consecutively in order without gaps, and 100 would preferably force the scheduler to consecutively schedule two (or more) modules. Alternatively, the scheduler could be operative to schedule modules in consecutive order when possible, without any indication of connection strengths between modules.

In accordance with a preferred embodiment of the present invention, the program may also be operative to assign students to classes responsive to the student information concerning primary and secondary languages spoken, written, and read by each of the students. This embodiment of the invention will be particularly useful in achieving the maximum integration of students for whom English is not a native language with students for whom English is a native language, so as to enhance their opportunities to learn English. In this embodiment, at least some of the modules will have associated therewith an indication of the minimal competency level in English that is required for a non-native speaking student to be assigned to a class in the module together with native English speakers (the class being taught in English). Similarly, at least some of the modules will have associated therewith an indication of the minimum competency level in English (probably lower than the previous level) that is required for assigning such students to a class to be taught in English exclusively for non-native speakers. Non-native speakers whose competency level in English is even lower may be assigned to a class in the module taught in their native tongue. In another embodiment, certain modules may be identified as being especially useful for integrating native and non-native speakers, and the program would be operative to assign students to classes in these modules such that appropriate proportions of native and non-native speakers are present in these classes.

The competency levels of the students may be based on standardized tests or assessments of the students in one or more relevant language modules. The minimal competency level may be a single measure for overall English language skills (speaking, reading and/or writing), or may consist of separate measures for each of speaking, reading, writing, and other language skills. In the latter case, a weighted average measure of each of the separate measures may be used to determine student eligibility to take a given module taught in English. For example, the teaching staff may decide that a primarily visual/spatial geometry math module requires greater competency in spoken English than in writing or reading ability. Although these embodiments of the invention have been described with reference to English as the primary language, it is appreciated that similar applications are possible with reference to any other language as the primary language, and with multiple additional secondary languages.

In a preferred embodiment of the invention, not all modules have strictly academic content. For example, some modules may be in sports. Others may be in the arts. Some of these modules (e.g., music) may be placed in the curriculum hierarchy with prerequisites indicated. However, other modules may be excluded from the necessity of prerequisites, and may therefore be offered in generally any order. For example, students may select from amongst different choices for their physical education classes, and the ordering of those modules typically does not matter. In these cases, the scheduling algorithms may be operative to schedule these modules last, as fillers or as relatively low priority items in the scheduling process. As appropriate, these may be scheduled based only on certain minimum requirements, such as gym class twice a week in a class having students of the same general physical age. In this manner, greater flexibility can be gained for other modules where scheduling priority is more crucial for student success, due to the nature of the subject matter.

In a preferred embodiment of the invention, the scheduler may also be operative to schedule in certain other non-academic time periods, such as lunch periods or study halls. These time periods may be treated as modules, or may be simply blocked out for certain students for certain parts of the schedule (e.g., a rotating lunch period across a large high school). Alternatively, these periods may be scheduled as very long (e.g., up to one year in length) modules, to prevent the need for continuous scheduling.

It is generally recognized that peer tutoring is an important pedagogical tool with many benefits, including serving as a useful review of the topic for the tutor, helping the tutor to think about the topic in a new manner, helping the tutor to develop useful skills, and helping the tutee to learn the material in a close, one-on-one situation. Despite this fact, most traditional educational institutions rarely take advantage on a large scale of the benefits of peer tutoring, and few incorporate it as an important part of their pedagogical program. In accordance with a preferred embodiment of the present invention, peer tutoring may be utilized as a significant educational resource, providing major benefits both for the students and for the teachers of educational institutions in which the present invention is implemented.

In accordance with a preferred embodiment, once a student has achieved a high enough competency level in the subject matter of one or more modules, or groups of modules, he becomes eligible in principle to tutor another student in the subject matter of these modules. In accordance with a preferred embodiment, the scheduling program is then operative to schedule tutoring sessions for the tutor and a tutee, who typically may be a student who is weak in a subject category, but may also be any student who has indicated an interest in being tutored. The tutoring sessions may be scheduled to take place in one or several time frameworks—after the tutee has finished taking a formal class in the module (so as to help him review the material prior to an assessment); in parallel with the tutee's participation in a formal class in the module (so as to help the tutee learn the subject matter of the module on an ongoing basis); before the tutee has taken a formal class in the subject matter of the module (this may be particularly helpful for tutees who do not do well in formal class settings), or in place of the student taking the class in a formal class setting, should the tutor be sufficiently competent.

The utilization of students as tutors, in the context of this embodiment of the present invention, has far-reaching consequences for the efficiency of the scheduling of classes in the educational institution. When used properly, the scheduling of tutor-tutee pairs will enable significant reduction of the average class size, which, in and of itself, will have a beneficial impact on the quality of the learning and teaching in the educational institution.

When the present invention is first implemented in an educational institution, it is expected that only a small number of students will be eligible for tutoring. However, in time, it is expected that a substantial proportion of the student body will be involved in student-to-student tutoring, such that at any given time 20 percent of the student population may be functioning as tutors and another 20 percent will be engaged as tutees. With 40 percent of the student population engaged in tutor-tutee pairs, the class size for the remaining 60 percent of the student population will be substantially reduced. In certain educational situations (such as apprenticeships), the percentage of tutor-tutee pairs could be significantly higher. In the high school setting, a certain degree of teacher supervision is typically appropriate in connection with the tutoring. However, since each tutor-tutee pair does not need a separate classroom and many pairs may be accommodated at the same time in a large room, such as a library or auditorium, only a few teachers will be used as supervisors (qualified volunteers and teaching aids may also be used to work with the teachers to help supervise large numbers of students), thereby making it possible to better allocate and utilize the teaching resources of the educational institution. In fact, by using currently under-utilized rooms of a school (such as the auditorium, lunchroom, or library of a high school), for both tutor-tutee sessions and even for regular classes, in accordance with the present invention, the present invention may have the additional highly beneficial effect of ameliorating classroom overcrowding without having to build new physical classrooms, thereby saving large sums of money while improving classroom conditions for both students and teachers.

In a corporate job training setting, the large scale use of peer to peer tutoring in accordance with an embodiment of the present invention will make it possible to minimize the number of trainers required to be hired to teach the employees at the corporation, thereby minimizing expense. In effect, the implementation of embodiments of the present invention will permit expertise to ripple across an organization in a highly effective fashion. The invention could also be programmed to provide summaries to management of the total training needs of the corporation, and note where that training is available internally and where it will be necessary to bring in outside trainers. Using this summary information, management may negotiate for much better rates for outside trainers in package deals. Software configured in accordance with a preferred embodiment of the present invention could also be programmed to compare the cost (in terms of salary and the like) of using employees as trainers versus hiring outside professionals.

The incorporation of tutor-tutee pairs within the framework of the scheduling program will have the added benefit of enhancing the flexibility of the scheduling process itself. Since, for scheduling purposes, every student who is eligible to be a tutor can be treated as if he were a "teacher," and since every tutor-tutee pair can be treated as a "class," the number of "teachers" available for assignment to classes and the number of potential classes for assignment are vastly increased. As a consequence, the number of possible groupings into classes of students and teachers also increases greatly, which makes it possible for the program to optimize more efficiently the various parameters that are taken into account in the scheduling process. Most preferably, many of the students who would otherwise have been scheduled for study hall can be selected to be either tutors or tutees.

Educational institutions in which aspects of the present invention will be instituted will also be better able to accommodate and provide for the needs of students with learning disabilities and for special education. In particular, they will be able to maximize the integration of students with learning disabilities in classes with other students, without sacrificing the special attention that such students may need. In accordance with one preferred embodiment, students having special educational needs would be so identified in the database, and the scheduling program would be operative to schedule such students in classes based upon one or more rules that the educational institution has determined with respect to such students. For example, students identified as suffering from attention deficit disorder (ADD) would be preferentially assigned to smaller classes, since ADD students do better in smaller classes in which the distractions of other students, which is a special problem for ADD children, is minimized. Preferably, these smaller classes would also include students who do not suffer from ADD, thereby promoting the integration of the ADD students within the general school population and providing the non-ADD students with the benefits of closer contact with a teacher in a smaller class. In accordance with another preferred embodiment, teachers who have special training and skills in teaching students with specific disabilities (for example, students who are visually impaired), would be preferentially assigned as teachers of classes which include students identified in the database as requiring such specialized skills, for all classes to which they are assigned, or for specific modules where the need is greatest in accordance with a preferred embodiment of the present invention, various categories of learning disabilities (e.g., dyslexia, ADD, and the like) may be specified in data storage device 16. In addition, the degree of disability within each category may also be specified (for example, by a number between 0 and 100, or by any other technique considered useful by specialists in the field). Teachers, administrators, learning disability, and curricular specialists may then determine, for any given module, which students with learning disabilities may be integrated with students without the disabilities. For example, it may be determined that students with certain forms of visual impairment should be educated separately in geometry modules but may be integrated with students without disabilities in modules which do not require as much visual work, such as modules in poetry or history. Or it may be more precisely determined that only students with visual impairments of a particular degree or higher need be separated out. The result would be a far greater integration of learning disabled students into regular schools in the conditions most effective for their success and for the success of the regular students. Information regarding which learning disabilities mix well with others (and in what degrees) could be specified in storage device 16 and used by the scheduling algorithms as well, for the best possible integration of learning disabled students with each other and with the rest of the student body.

Teacher retraining and preparation may also be given special emphasis in a preferred embodiment of the invention. Specifically, the scheduling algorithms may be focused in such a way as to use data regarding teacher competency to enhance the opportunities for teacher retraining by the teaching staff of the educational institution itself. Thus, teachers who have been determined to be "master teachers" (based upon past teacher performance with students) may be scheduled to teach a class for other teachers in how to teach a particular module. Similarly, a teacher who requires training in a particular module may be assigned to observe a master teacher teaching a class of students in that module, or the master teacher may be assigned as an observer of a class in that module taught by another teacher who has not been successful in the past in teaching that module (based on student assessment data). These methods of training, when scheduled at opportune times (such as before a teacher must teach a particular module), can be used to improve the training of a particular department or subject in a particular set of modules, or to cross-train teachers from one department or subject in modules in another, such as by training physics teachers to help teach chemistry. In addition, by scheduling training sessions appropriately, and by combining this scheduling with the specialized coding of modules according to how they may require specialized teaching for different categories of learning disability (mentioned above), the scheduler can effectively disseminate training that regular teachers need to teach learning disabled students in various modules. It can do this on a "just in time" basis—where teachers receive the training shortly before they must teach the module, or it can do it on a generalized training model, where the teaching staff of an educational institution is slowly ramped up in their abilities to teach particular modules and/or to teach children with particular learning disabilities, independent of the actual schedule of classes.

It is noted that some embodiments of the present invention do not limit the scheduler to the creation of classes in which students all have equal levels of mastery of all of the prerequisites, i.e., completely homogeneous classes. These embodiments can instead use the various prerequisite techniques described herein (e.g., the use of weighted averages across a number of prerequisites to a given module) in order to create more heterogeneous classes based on mixing students of differing prerequisite mastery levels. For some applications, administrators weaken the prerequisite requirements for some students to enter certain modules, while for other applications, the administrators may increase the prerequisite requirements for some students to enter a module. It is to be understood that some subjects are taught more effectively with a more heterogeneous approach and others with a more homogenous approach, and that some preferred embodiments of the present invention are configured to allow administrators to define a level of heterogeneity for some or all modules taught in their school. An analysis of the database of assessments stored in data storage device 16 can provide administrators with useful feedback in this regard, as can the direct feedback of students.

By using these techniques to vary the prerequisite requirements across students, the scheduler can be used to create more heterogeneous classes, as appropriate, in a systematic manner for certain (or even all) parts of the curriculum. Educational staff may find that it is helpful for student success to put students with lower success rates into more heterogeneous classes, for example. Alternatively, a university level one week module entitled, "Free will: A neuroscience perspective" might advantageously have higher prerequisite requirements for students majoring in biology and philosophy, and somewhat lower prerequisite requirements for students taking the module simply to fulfill a distribution requirement.

In accordance with a preferred embodiment of the present invention, greater heterogeneity in a class is obtained, while requiring the students assigned to the class to have generally the same prerequisite mastery level, by the scheduling program: (a) analyzing the database to see how quickly students progress through modules in each subject, and (b) subsequently trying to mix into a given class students of different abilities who have completed the prerequisites for the class. Similarly, student feedback could be used to purposefully have the scheduler mix different types of students into common classes.

In a preferred embodiment of the invention, required threshold grades for less central modules in the curriculum are automatically lowered for students who are not going through the curriculum fast enough. To do this, for example, the scheduling algorithm may look at the weights which are indicative of how central the modules are to the core curriculum, and lower the threshold passing grades for modules with lower weights, if appropriate for certain students. This procedure is preferably done responsive to administrator input indicating how much latitude the scheduling algorithm has to automatically adjust required threshold passing grade levels.

In a preferred embodiment, an absolute minimum threshold grade is designated for particular modules, subjects, or the whole school. Alternatively or additionally, a set of allowable lower limits is defined which depends upon the centrality of each module to the curriculum (as represented by the weight attached to it). Following is an example of such a set, where the weights that represent how central a module is to the curriculum vary from 1 to 100:

For weights of 1 to 25, the threshold passing grade is 70%.
For weights of 26 to 50, the threshold passing grade is 80%.
For weights of 51 to 75, the threshold passing grade is 85%.
For weights of 76 to 100, the threshold passing grade is 90%.

For some applications, the educational institution may initially require students to achieve a 90% threshold grade in all modules, but upon finding students who take too many repetitions of certain modules to pass (or who cannot consistently achieve that goal), the variable thresholds described above could be used instead.

In preferred embodiments of the invention, the program alerts the administration in circumstances where students (individuals, students of certain ages or levels, or students across the entire educational institution) are not making adequate progress relative to a standard level of progress expected for their level of study. This allows the administration to evaluate if they are teaching too much content, need to lower threshold grades, or use other strategies, such as scheduling additional classes after school and the like. In a preferred embodiment of the invention, educational staff will be able to modify threshold grade requirements for particular modules, subjects, or the entire curriculum as appropriate. It is to be understood that variable threshold passing grades may be determined according to whatever assessment method the educational institution uses for particular modules, and could be based on exams, quizzes, homework, and the like, or could be based on the results of projects or interviews.

Preferably, the output of the scheduling algorithm comprises:
(a) a list of modules which each student is studying, noting also the name of the responsible teacher and the time of instruction;
(b) for all teachers, which modules they are teaching, noting also the students in the class and the scheduling of the class;
(c) for classes, the overall master schedule for the educational institution;
(d) for tutoring sessions, information such as the time, location, participants, and module covered for each tutoring session; and
(e) additional information, as appropriate, such as which classrooms (if any) modules are scheduled in, which formats (e.g., online or person-to-person) are used, which teaching styles are used, etc.

It is noted that the scheduling algorithms that generate the various teacher, student, and class schedules can be operative to generate the schedules in a variety of different orders, and do not necessarily need to generate schedules in a sequential order, e.g., from 9 AM March 1 through 3 PM March 31. Also, the scheduling algorithms do not necessarily need to fill in one class entirely before scheduling the next class. For example, the scheduling algorithms may be configured in such a manner as to schedule the most difficult-to-schedule students for many modules over a relatively long time frame, before scheduling other students. An example of a student who may be generally more difficult to schedule would be a learning disabled student, such as one who has a severe case of dyslexia and has very specialized requirements, for whom only a limited number of teachers have been found to be effective. Another example would be an ADD (Attention Deficit Disorder) student, who preferably sits in classes having relatively few children, in order to be able to properly focus on the lesson at hand without being overly distracted by other students. The scheduling algorithms may schedule this ADD student into a large number of modules before the other students are scheduled, in order to be sure the student is placed in small enough classes before these classes are filled.

For some applications, certain modules are designated by teaching staff or administrators as critical at a given time for a significant group of students to meet graduation requirements. In this case, the critical modules may be scheduled out far in advance, before other modules are scheduled.

In one embodiment of the invention, the scheduling algorithms may generate a skeleton (partially filled in) schedule over a fairly long period of time, and then schedule the other classes around that skeleton schedule in the optimal manner. A variety of different blended approaches like this are preferably provided, which combine determining a certain part of the schedule in a more rigid fashion, and permitting other parts of the schedule to be varied by the scheduler as appropriate.

It is noted that although the scheduling algorithms typically determine the educational institution's classes a certain period of time in advance, there may be temporary "jagged edges" in the schedule (that is, not all classes will necessarily end at precisely the same end point), especially towards the end of the period. Thus, if the scheduling algorithms are scheduling in advance by about 3 months, some student schedules may have some classes that end after the 3 month period, because the duration of some modules extend the schedule beyond the 3 month time frame. If it is desired, these jagged edges can be removed, for example by the use of study halls, but typically the scheduling algorithms are quite flexible in this regard, and only removed jagged edges at the onset of the end of a term. In a preferred application, an educational institution determines schedules for about 3 months in advance, but then performs some rescheduling each month as new assessment information is obtained (for example, if some students do not achieve the threshold grade for a module and need to repeat it).

It is noted that there are many ways to organize schedules, and that the scheduling algorithms may be implemented to fit a variety of different strategies. Some high schools, for example, use a 5 period day with about 1 hour per period. It could be decided that most modules and their assessments should take 15 hours at 1 hour per day, i.e., 15 school days. If the high school were generating schedules 3 months in advance, therefore, they will typically schedule in a given time slot about 4 modules for the three month period. In other words, a student may have a 1st module in Period 1 for the first 3 weeks, then a 2nd module in Period 1 for the next 3 weeks, then a 3rd module in Period 1 for the next 3 weeks, then a 4th module in Period 1 for the last 3 weeks of the 3 month period.

In another example, if a high school uses a block schedule, it could decide that some 3 week long modules are to be either 2.5 hours per day on Tuesdays and Thursdays, or Monday, Wednesday and Friday for the same 3 weeks for 100 minutes per day. The scheduling algorithms would preferably be operative to schedule modules across the different formats, and should teachers or school administrators prefer, modules could be associated with particular scheduling formats (such as six 2.5 hour sessions versus nine 100 minute sessions).

Advantageously, scheduling in a variety of different orders using a combination of modularizing the curriculum and mapping dependency relationships between the modules, allows administrators to discover and exploit flexibility inherent in the curriculum that is generally not revealed using tools of the prior art. If an entire K-12 curriculum, for example, consists of 600 modules, it could easily be that a given student is ready to take 50 or 60 of them at a given time. In a traditional educational institution, such as a high school, a student typically studies content that correlates with approximately five of those modules, and is likely being made to learn at least some content which correlates with modules from among the other 540 or 550 modules that he is not ready to take, or has already mastered at the time he is taking that content.

It is noted that for many applications described herein, schedules for the different students will tend to differ significantly, as the students make their way individually through mastering the curriculum offered by the educational institution. For other applications, however, a bias is operative in the scheduling algorithms to facilitate keeping groups of generally similar students together, sometimes even at the expense of other parameters to be optimized, such as class size or preferred learning styles. Such applications are preferable in educational institutions which decide that it is particularly important to promote group cohesion by keeping the same students together over many modules.

An educational institution may decide that certain parts of its schedule should continue to be determined in the traditional format, in which case the scheduling algorithms could be set to schedule around those periods of time. So, for example, a religious school may want to have religious studies in a traditional format during the first half of every day, and then have the scheduler schedule the second half of the day. Alternatively, the school may designate the morning for religious studies for half of the student body and the afternoon for religious studies for the other half, in which case the scheduler will for any given time work with whichever students are available and required to be scheduled by it.

It is known in the field of education that on occasion some students become "phobic" in a subject area, i.e., they become convinced that they cannot do well in a particular subject, such as math or history. The scheduling algorithms are preferably operative to dynamically and automatically provide a greater amount of tutoring for students who are taking modules in subjects in which they have either indicated they are phobic, or in which the invention has determined that they tend to do poorly. (For example, the algorithms may determine that a student tends to repeat modules in a particular subject area significantly more often than does his peers.) If appropriate, the scheduling algorithms may designate for these students one of the better student tutors, as determined, for example, by statistical analysis of the database of assessments in data storage device 16 or by direct student input. If a student is particularly weak in a subject, the scheduler could even be operative to schedule one-on-one or small group tutoring sessions with a teacher, or generally smaller classes in that subject, etc.

For some applications, the scheduling algorithms are operative to produce a student's schedule during a session in which the student inputs a series of scheduling requests, e.g., particular modules, teachers, scheduling constraints, or tutor requests. After each request, the algorithms generate a schedule in accordance therewith, to the maximum extent possible given other constraints under which the algorithms operate. Alternatively or additionally, in this manner each student in the school is able to enter one or more requests which are accommodated in the scheduling process. Further alternatively or additionally, administrators, teachers, or students enter such requests, and the scheduling algorithms attempt to accommodate the requests in accordance with constraints defined by an authorized person.

In a preferred embodiment of the present invention, computer stations that link into one or more servers 12 are strategically placed in a variety of locations. Students—for example in an adult education program in a particular city—could simply walk into the centers where the stations are housed, and the people running the center (or the students themselves through direct input into a browser) would input to a local computer a unique student identifier, e.g., a unique numeric identifier for every student, or some combination of other data such as first and last name, city of birth, birth date, etc. The scheduler would then be operative to combine the students present at the center in a manner best suited for their forward progress through a curriculum. It could, for example, put some group of students together with professional or volunteer staff (or temporary volunteers) at the center, who are capable of teaching a module(s) that the assembled students are ready to learn. Alternatively, the scheduler could determine that one student is capable of tutoring another (or a group of others), and therefore assign that student to lead a tutoring session. Typically, a large group of assembled students can be divided into a plurality of classes as well as a plurality of tutoring sessions.

The scheduler may intermittently determine that an assessment is appropriate, for example, if a student is present for whom there is no available teacher or tutor. The central database (stored on data storage device 16) preferably contains printable assessment quizzes for this purpose. The database could also contain suggested lesson plans for each module, and printable curricular materials for the assembled students to use.

Because the center is envisioned as typically being the primary source of learning for many of the students, it generally does not matter if they come in infrequently (e.g., every few weeks), because the program could simply begin at the point where it had ended a previous session, if appropriate. If the students were enrolled in another educational institution as their primary institution, then the scheduling algorithm could be operative to coordinate with that institution so that more recent assessment information would be available for the algorithm to access. It should be noted that the various centers to which students could go are generally interchangeable, in that a student could go to any of them, and be assigned to work with available staff and any other students who are there at the same time.

Preferably, the scheduling algorithm is operative to coordinate future classes at a center. Further preferably, the algorithm helps students to schedule their own classes at the center, based on what resources are expected to be available at any given time. For example, the program could be operative to let students know that instructors who are eligible to teach certain modules the students are ready to take are available later in the week at a given time, and the students could sign up in advance for sessions with those instructors.

In accordance with a preferred embodiment of the invention, teacher workloads may be constrained to a limited number of modules from among those they are eligible to teach. The scheduling algorithms will preferably limit the educational institution's schedules to those which satisfy these teaching workload constraints. So, for example, if an English teacher were constrained to teaching three specific English modules (E23, E32, and E38) over a 5-month period, the scheduler would only be operative to schedule the teacher in those modules over that period. Alternatively, the scheduler could be constrained to limit the number of modules a teacher would teach in a given period, but the scheduler could choose which modules those would be, in accordance with optimization techniques described herein.

For some applications, modules in the curriculum could be grouped by teachers into functional sub-groups, and the scheduling algorithms could be operative to schedule teachers only in modules (or a limited number of modules) within one or several sub-groups at a given time. So, for example, all modules related to force and motion in physics could be in one sub-group, and a physics teacher could be scheduled only within these force and motion modules over a certain period of time, and then in modules from another sub-group over another period of time, so as to make preparation for classes easier.

In accordance with a preferred embodiment of the present invention, in which the students are children, parents of the children may not only access information about their children's schedule of classes, but also be notified in advance of scheduling events that will enable the parents to better assist their children in learning the curricular modules. In one embodiment, a parent may indicate that he has competency and/or interest in particular modules and is capable of assisting his child in learning those modules. In such an event, the program may be operative to notify the parent in advance that his child is scheduled for a class in one of these modules so as to enable the parent to set aside time to be more involved in the child's learning of these modules. The notification may be in the form of an automatic email, phone call, letter, page or other appropriate method. Alternatively or additionally, the program may be operative to inform the relevant teacher of the parent's indicated skill or interest, thereby enabling the teacher to contact the parent to invite him to participate in the teaching of the class. Similarly, non-parent volunteers, with appropriate authorization from the school administration, may indicate their interests and competencies in particular modules, and the program may be operative to make the information available to the teachers.

It will be appreciated that, over time, a large amount of cumulative data will be amassed on data storage device 16 concerning the teachers and students of the educational institution. With respect to the students, the data will provide a detailed record of all modules each student has taken, the teachers who taught him the modules, and the assessments of his competency level before and/or after completion of the modules. The data will also provide a record of the students both as tutors and tutees. For the teachers, the data will include a detailed record of the modules they taught, the students who were in their classes, and the achievements of their classes as reflected in the assessments of the students. In accordance with a preferred embodiment of the present invention, the program is operative to analyze this storehouse of data so as to determine patterns or associations that may be significant from a pedagogical perspective, both for the teachers and for the students.

For example, the stored data of the assessments of the competency levels of each of the students can be analyzed statistically, providing an indication of the average improvement of the student over time, with respect to groups of modules or individual modules (if the student repeated classes in the same module) or providing an indication of the teacher with whom the student achieved the most significant improvement. If a meaningful correlation is determined between a specific teacher and the improvement in a student's competency level, the program would then be operative to selectively assign the student (or to assign him more often) to classes taught by such a teacher, rather than by another teacher with whom the student may not have shown such improvement. In a similar fashion, the data concerning student tutor—tutee pairs may be analyzed, providing an indication of the degree of improvement of the tutee and/or the degree of success of specific students as tutors.

The accumulated data will also provide the administration of the educational institution with a valuable tool for evaluating the strengths and weaknesses of its teaching staff. For example, it will be able to ascertain that certain teachers are more successful teaching certain modules and less successful teaching other modules. In such an event, the program may be operative to preferentially assign teachers to teach those modules in which they have a higher average performance, and minimize their assignment as teachers of other modules. The data would also enable both teachers and administrators to more easily be made aware of the subjects or topics in which teachers are weak, and the administrators could then refer the teachers for continuing education classes in the subjects in which they are weak or help them to take advantage of retraining options made possible by the preferred embodiments of the invention described herein.

In accordance with a preferred embodiment of the invention, the scheduling program would also be operative to access data inputted by the teachers and the students concerning the times they are or are not available for classes. The program would then selectively schedule classes for the teachers and the students only for the times that they are available. This application of the invention would be particularly useful for concentrating a teacher's teaching schedule or a student's class schedule into blocks of time, so as to accommodate other scheduling needs of the teachers and students. For example, in a job training setting, the teachers and the students may only be free for classes on a certain day of the week, or during certain hours of the day, and the scheduler would be operative to schedule classes to occur only in available teacher and student times.

It will be appreciated that the combination of a modularized curriculum and a sophisticated resource management program in accordance with aspects of the present invention makes it possible to devise teaching schedules and schedules of classes that optimize the various parameters that have been described hereinabove which directly or indirectly affect the quality of the teaching and learning that takes place in the educational institution. Preferred embodiments of the present invention adapt algorithms that are known in the art to optimize these parameters, within the constraints of generally only placing students in classes for which they have attained substantial competence in the subject matter of the modules prerequisite thereto. A person skilled in the art will appreciate that there are many ways for generating a generally optimized schedule based on a set of constraints and a set of variables to be optimized. In one embodiment of the present invention, a score or weight is given to each of these parameters, and the optimizing software searches through a large number of possible schedules for the entire school, in order to determine a set of class schedules that generate a maximum score from which a final schedule will be determined.

By way of illustration and not limitation, typical parameters to be optimized may include: (a) class size; (b) expressed teacher preferences to teach particular curricular modules; (c) expressed student preferences for a particular module, subject, or teacher; (d) data indicating the success of a particular teacher with respect to a particular student or module; (e) geographical distance that must be traversed by students and teachers between successive classes; and (f) preferential scheduling of modules whose subject matter comprises the "core" of the curriculum.

Table 1 shows a sample scoring system (showing only three of the large number of potential parameters) that may be used in accordance with a preferred embodiment of the present invention:

TABLE 1

| Parameter | Value |
| --- | --- |
| Student preference for a module | 0 if student is ineligible for module<br>1 to 100, according to student's choice, if student is eligible for module |
| Teacher preference for a module | 0 if teacher is ineligible to teach module<br>1 to 100, according to teacher's choice, if teacher is eligible to teach module |
| Centrality of module to curriculum | 1 to 100, with 1 meaning the module is least essential to the curriculum and 100 meaning it is most essential, with gradations in between. |

It will be appreciated that the various parameters themselves may be accorded weights with respect to one another, providing an indication of the relative importance of the various parameters within the overall pedagogical framework of the educational institutions. This relative weighting would then be taken into account in maximizing the various objective functions in the process of assigning students and teachers to classes and producing schedules of classes. It will also be appreciated that an educational institution may vary the relative weighting of the various parameters, on an ongoing and dynamic basis, resulting in different schedules having different emphases and significance from the perspective of the teachers and the students.

Reference is now made to Table 2 below, which lists representative variables and parameters which may be used for a mathematical articulation of the method of an embodiment of the present invention. In this table and the equations which follow, the index s (taking on values from 1 . . . S) represents a student, the index m (taking on values from 1 . . . M) represents a module, the index t (taking on values from 1 . . . T) represents a teacher, and the index c (taking on values from 1 . . . C) represents a class. A parameter, such as $r_{sm}$, which represents the readiness of a particular student to study a particular module, may have any decimal value between 0 and 1, although it will be appreciated that in a particular algorithm definition these values may be increased in range and/or shifted along an absolute scale by the use of suitable constants (represented by the letters k and c, indexed by numbers, e.g. $k_1$). In the case of the parameter r, a value of 0 would indicate that the student is not ready for the module and would not benefit from being exposed to it. A value of 1 would indicate that the student is fully prepared for the module. Intermediate values could be used at the discretion of the educational institution to indicate such conditions as a student possessing most of the prerequisites for a module. In Table 2, each parameter is described only briefly, and its full intent should be understood in terms of the preceding description.

It will be appreciated that many of the various constants and parameters described herein, such as $k_i$, may in fact be single- or multi-dimensional vectors, taking on different values as a function one or more relevant axes. For example, $k_2$ is described hereinbelow with respect to a relative desire for tutoring versus classroom-based education, and may have a value such as 0.6. In the vector form, however, $k_2$ may have the range of values {0.55, 0.6, 0.65, 0.9}, each value corresponding respectively to the desirability of tutoring in the 9th, 10th, 11th, and 12th grade levels. Similarly, $k_2$ may be a two dimensional array, defined as $k_2$(grade level, X}, where X equals 1 for math and science modules, 2 for humanities, and 3 for other all others.

TABLE 2

| Parameter | Description |
| --- | --- |
| $r_{sm}$ | Readiness of student s to study module m. |
| $u_{sm}$ | Readiness of student s to teach (tutor) module m. |
| $e_{sm}$ | Readiness of student s to be tutored in module m based solely on the number of times he/she has previously been tutored, and how successful he/she has learned in tutoring situations, either in general or in the subject of module m. Note, this parameter is independent of r. |
| $i_{tm}$ | Suitability of teacher t to teach module m. |
| $w_m$ | Importance (or weight) of module m within the curriculum. |
| $p_{sm}$ | Preference of student s to take module m based on both desired specialization (core classes) and expressed preference (electives). |
| $c_{stm}$ | Success student s has had in learning with teacher t in subject area of module m. Optionally, this parameter may also be adjusted to incorporate a bias towards keeping a student with the same teacher over multiple terms. |
| $A_c$ | Measure of the preference of the age range in class c. For example, 1/(oldest-youngest) could be used. |
| $Y_{sc}$ | Suitability for student s to learn in class c, based on factors such as ADD vs. class size, language skills vs. class composition, and so on. |
| $S_c$ | Measure of the preference of the size of class c. For example, 1/(#/students), or 1/(ideal #-actual #). |

Figure 5:
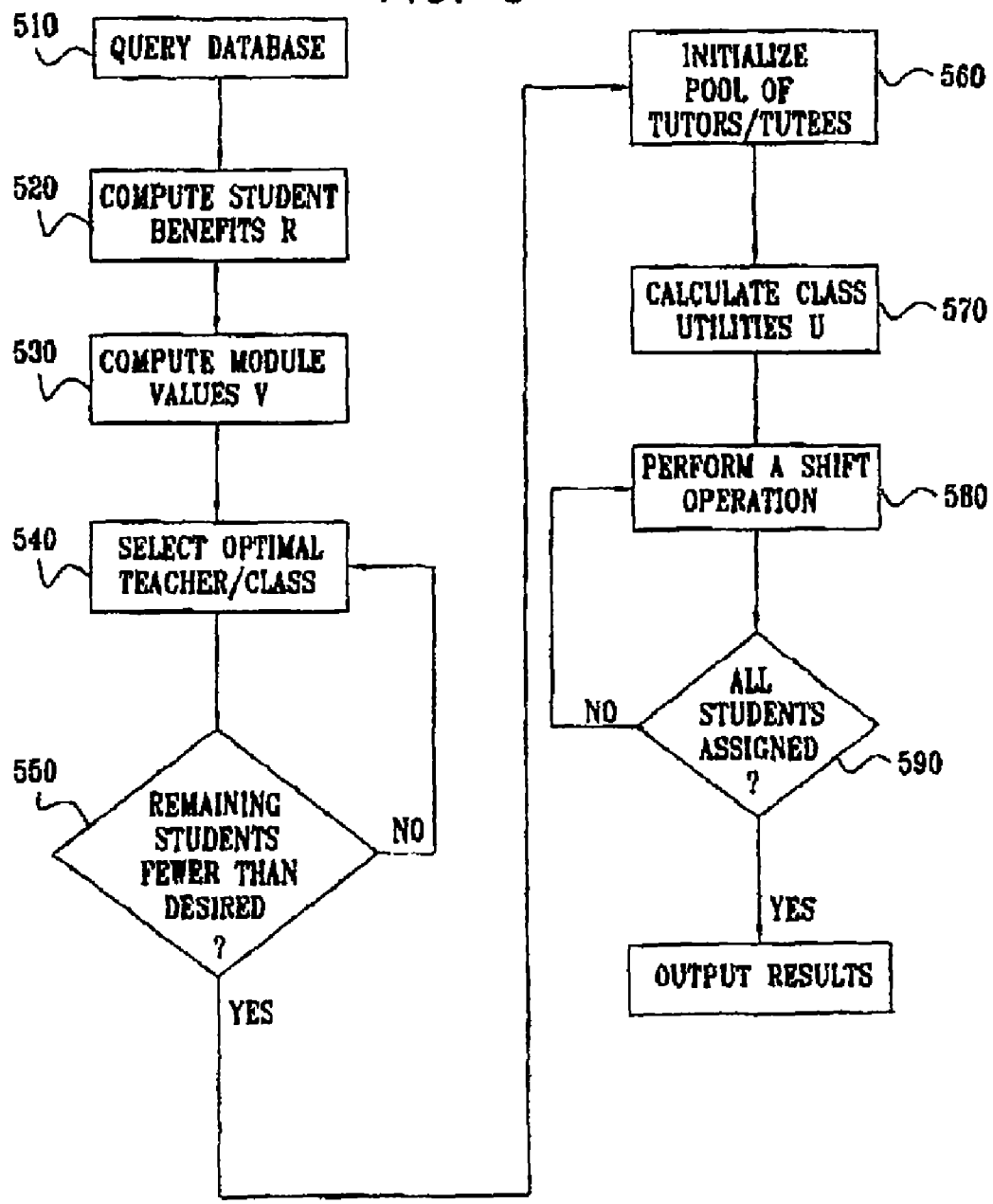
FIG. 5 is a simplified flow-chart of a set of procedures for optimizing the assignment of students and teachers to classes, in accordance with a preferred embodiment of the invention.

Reference is now made to FIG. 5, which is a simplified flow-chart of an enhanced set of procedures for optimizing the assignment of students and teachers to classes, in accordance with an embodiment of the present invention.

Procedure 510: The program accesses the educational resource data stored on data storage device 16, including the curriculum information, the teacher information, and the student information.

Procedure 520: The program computes, for each student, the relative benefit R he/she would derive from studying each module with a regular teacher, based upon the parameters r, w, p, and e. For example, we might set $R_{sm} = k_1 r_{sm} w_m p_{sm} - k_2 e_{sm}$. Here, the constants $k_1$ and $k_2$ are set to nonzero values determined partly by the overall priority to be accorded the factors they are associated with in the definition of R by the school administrators, and partly by the need to keep all constants in the algorithm in balance with one another so that one factor does not end up dominating the result; the possible need to apply trial and error as a final step in connection with selecting their precise values for best algorithm performance (in terms of speed of computation and quality of solution) will be appreciated by those versed in the art. The values are set to be the same for all students and modules for a given run of the algorithm, but may be varied between different runs.

It is noted that $r_{sm}$ or another parameter may be determined, at least in part, in order to provide a desired amount of time between student s taking a module $m_{previous}$ and the student taking module m whose content is related.

In a preferred embodiment, some students (e.g., those with low grades or with learning disabilities) may be favored in scheduling, such that, for example, any $r_{sm}$ values greater than 0.75 are automatically increased to be 1.0, so as to increase the likelihood that they will in fact be scheduled to sit in a class teaching a module from which they would maximally benefit. Alternatively, a new "favoring" parameter, $f_s$, may be introduced and used in scheduling optimizations algorithms to indicate the extent to which the educational needs of student s should be favored in establishing classes and tutoring sessions.

Procedure 530: The program computes, for each module, the total value it possesses for students at present, based on the benefits it would provide to each student as computed in Procedure 520: $V_m = f(R_{1...S}, m)$; the function f could be any function of the elements $R_{1m} \ldots R_{Sm}$, for example, a simple sum.

Procedure 540: The program identifies the module-teacher pair for which $k_3 V_m + k_4 i_{tm}$ is a maximum, say $m_0, t_0$. Since V will be affected by how many students will benefit from a module as well as by how much they would benefit, this procedure will tend to select the modules most needed by the greatest number of students. A predetermined number of students (equal to the average class size) with the highest R's for the module (regardless of whether they have a higher R for another module) will be designated for a class in the subject matter of the module $m_0$, taught by teacher $t_0$, and eliminated from further consideration for the time being, along with the chosen teacher. It is noted that the constants $k_3$ and $k_4$ are preferably set to nonzero values determined by the overall priority to be accorded to the factors with which they are associated, so as to determine the best module-teacher pair.

Procedure 550: The program checks whether the number of students and/or teachers remaining falls below a predetermined quantity. For example, the program may continue until all teachers have been assigned, or it may continue until the number of students remaining is approximately the desired number to be engaged in tutoring. Alternatively or additionally, the check may be based on whether the highest remaining R value among unassigned students (for any module) falls below a given standard. In either case, if the program determines that the desired condition has been met, it proceeds to Procedure 560. If the condition has not been met, the program returns to Procedure 540 and schedules another class.

Procedure 560: After the desired number of teachers and classes have been assigned, the program provisionally assigns any residual students, if there are any, to a pool of students who may tutor or be tutored in a module.

Procedure 570: For each class, the utility U is calculated as $$U_c = k_5 A_c S_c + k_6 \sum_{s \in classc} Y_{sc} + k_7 \sum_{s \in classc} c_{stm} - k_8 \sum_{s \in classc} e_{sm}$$

(In this case, the readiness of students to be tutored in the subject matter is considered as a negative influence on class utility.) Again, the constants $k_5$-$k_8$ are typically set to nonzero values determined by the overall priority to be accorded the factors they are associated with in the determination of the utility U.

Procedure 580: The program performs one of several possible "shift" operations:

(1) Assigns student $s_1$ to tutor student $s_2$ (both from the pool of unassigned tutor/tutee students) in module m, based on the values of R, e, and u for the pairing in question.

(2) Moves student $s_1$, already assigned to a class, into the tutor/tutee pool as either a tutor (guided by e, u, R, and U), or a tutee (guided by e, u, and U) paired with a student currently in the unassigned pool.

(3) Moves student $s_1$, in the unassigned pool, to a class, guided by similar considerations to operation (2).

(4) Breaks up a class c, based on consideration of the utility U of the class versus the need for supervision of the currently assigned tutor/tutee pairs. All students formerly in the class then go into the unassigned pool, to be later assigned either to a tutoring pair or to another class.

(5) Shifts students from class $c_1$ to class $c_2$, in order to increase $U_{c1} + U_{c2}$ and/or because $r_{sm}$ for $m_2$ is greater than $r_{sm}$ for $m_1$.

Procedure 590: The program checks whether there remain any students over and above a predetermined maximum residual number who have not been assigned to either a class or a tutoring pair, and whether sufficient teachers are provided to supervise the tutoring. If there are sufficient teachers and no residual students, the algorithm terminates. Otherwise, control is returned to Procedure 580. Because operations (1)-(3) in Procedure 580 all result in a decrease in the number of unassigned students, and operation (4) will only be carried out a limited number of times (perhaps until a predetermined fraction of the students are involved in tutoring), the algorithm will eventually terminate.

Figure 6:
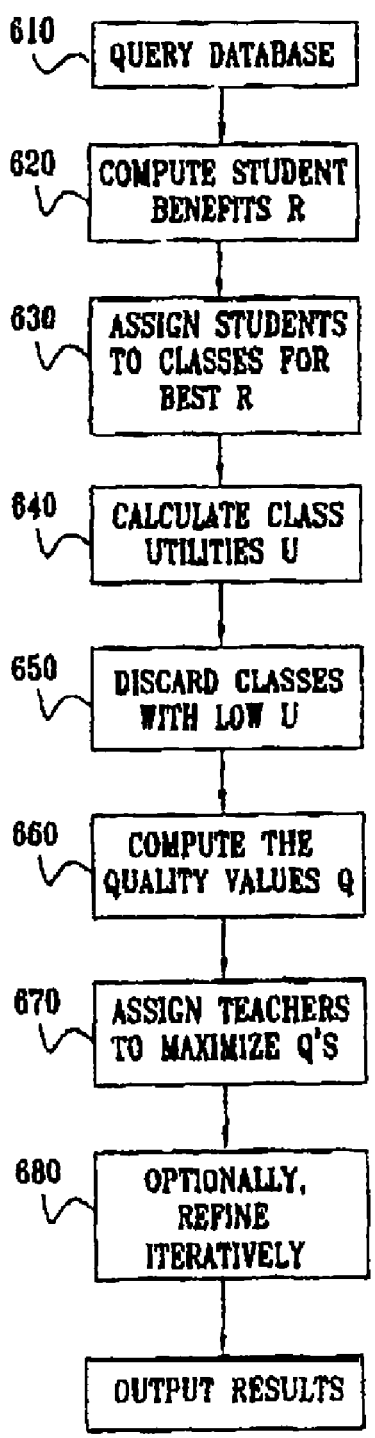
FIG. 6 is a simplified flow-chart of an additional set of procedures for optimizing the assignment of students and teachers to classes, in accordance with a preferred embodiment of the invention.

Reference is now made to FIG. 6, which is a simplified flow-chart of an additional set of enhanced procedures for assigning students and teachers to classes, in accordance with an embodiment of the present invention.

Procedure 610: The program accesses the educational resource data stored on data storage device 16, including the curriculum information, the teacher information, and the student information.

Procedure 620: The program computes, for each student, the relative benefit R he/she would derive from studying each module, based upon the parameters r, w, p, and e. For example, we might set $R_{sm} = k_1 r_{sm} w_m p_{sm} - k_2 e_{sm}$. As discussed in connection with the previous procedure (steps 510-590) above, the constants k are chosen based on the priorities accorded the factors they are connected with as well as considerations of overall balance.

Procedure 630: The program assigns each student to a class in the module for which his/her R value as computed in Procedure 620 is greatest. There is no minimum size to form a class, but once a class in a module has more than the maximum permitted class size, an additional class in that module is created.

Procedure 640: For each class, the utility U is calculated as $$U_c = k_3 A_c S_c + k_4 \sum_{s \in classc} Y_{sc} - k_4 \sum_{s \in classc} e_{sm}$$

Note that here, the readiness of students to be tutored in the subject matter is considered as a negative influence on class utility. Again, the constants are chosen based on priority and the need to balance them with the other constant values present in the algorithm.

Procedure 650: Enough of the classes with the lowest U values as calculated in Procedure 650 are discarded so that the number of remaining classes matches the number of teachers available.

Procedure 660: For each class, the program computes the quality of instruction Q that each teacher t could potentially provide, based on both that teacher's suitability to teach the designated module and his history with each of the students in the class:

$$Q_{ct} = i_{tm} \sum_{s \in c} c_{stm}$$

Procedure 670: Utilizing linear programming or a related technique known in the art, the program assigns teachers to classes in such a way as to maximize the sum of the Q's computed in Procedure 660 for the chosen pairings.

Procedure 680: Optionally, the program recalculates the utility values U for all the classes, and performs iterative adjustments as in Procedures 570-590 above.

Figure 7:
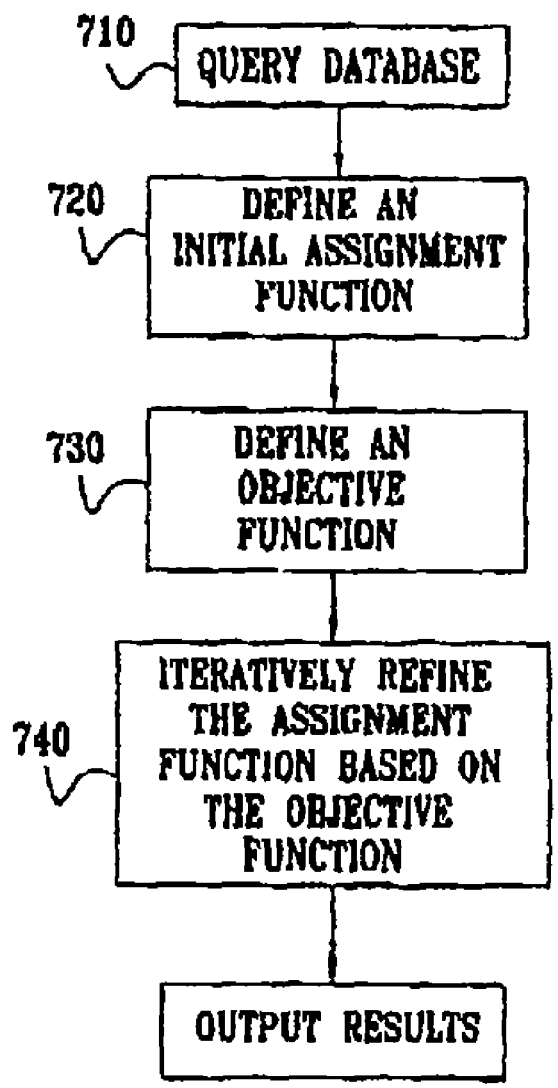
FIG. 7 is a simplified flow-chart of an additional set of procedures for optimizing the assignment of students and teachers to classes, in accordance with a preferred embodiment of the invention.

Reference is now made to FIG. 7, which is a simplified flow-chart of yet another set of enhanced procedures for assigning students and teachers to classes, in accordance with an embodiment of the present invention.

Procedure 710: The program accesses the educational resource data stored on data storage device 16, including the curriculum information, the teacher information, and the student information.

Procedure 720: An assignment function a(s,m,t) is defined based on the assignment of student s to module m with teacher t. In every case, the function takes on either the value 0 or the value 1, with 1 reflecting assignment and 0 reflecting non-assignment. A second version of the assignment function is defined, also written using a, but distinguished by its arguments, for example, $a(s_1,m,s_2)$=the assignment of student $s_1$ to module m tutored by student $s_2$. These assignments are subject to various constraints, for example, the fact that a student is assigned to only one class or tutoring session is represented by the constraint $$\sum_{t,m} a(s_0, m, t) + \sum_{s,m} a(s_0, m, s) = 1,$$

and the fact that a class should have about I members ideally is represented by the constraint $$\sum_{s,m} a(s, m, t_0) \approx I.$$

Similar constraints may be laid on the tutoring assignment function. In addition, separate assignment functions are defined for pairs such that $a(s, m, t) = a(s, t) \cdot a(s, m) \cdot a(m, t)$. Additional constraints are specified on the pair functions:

$$\sum_m a(m, t_0) = 1$$

requires that a teacher teach one module at a time, and $$\sum_s a(s, m_0) \approx J$$

constrains the number of students studying a particular module to be approximately equal to the number J that may relate to the number of teachers available (e.g., for specialties like art, music, or shop).

Procedure 730: An energy function (also known as an objective or potential function) is defined containing a term for each parameter in Table 1 above, for example:

$$H(a) =$$
$$k_1 \sum_{s,m,t} a(s, m, t)(r_{sm} - c_1) + k_2 \sum_{s_1,m,s_2} a(s_1, m, s_2)(e_{s_1 m} - c_2)(u_{s_2 m} - c_3) +$$
$$\ldots + k_6 \sum_{s,m,t} a(s, m, t)(c_{stm} - c_7) + k_7 \sum_{i,j} (R(\{s: a(s, m_i, t_j) = 1\}) - c_8) + \ldots$$

The constants (here labeled by both $k_1$-$k_7$ and $c_1$-$c_8$) are again set based on priority and the benefit of balance, as described in connection with the previous two procedures (steps 510-590 and steps 610-680) above.

Procedure 740: The program optimizes H by one of several standard techniques known in the art. For example, gradient descent could be applied: at first, most of the constraints could be loosely enforced (soft constraints), and a could be allowed to vary continuously rather than just taking values 0 and 1. Progressively, the constraints (including restriction on the values of a) could be enforced more strongly as a solution is reached. In another case, a simulated annealing approach could be applied: starting from an initial random assignment, single shifts in the assignments a could be performed, with the effects on H calculated and used to determine whether to accept the shifts; shifts that degraded rather than improved H would be accepted relatively frequently at first, then gradually less frequently as a solution is approached.

It will be understood by one skilled in the art that the above-described algorithms may not always achieve a perfect result. In particular, the nature of the constraints in a particular situation may be that the satisfaction of one implies the violation of one or more others, and that the algorithm computes a trade-off based on the relative weight given to the different factors according to the constants. Furthermore, it will be appreciated that variation in the manner in which the initial parameter values are calculated may allow for the implementation of different priorities for the scheduling process. For example, if part of a module definition included the specification of one of several possible teaching styles (so that a single chunk of educational material is represented for the purposes of the algorithm as several distinct modules differing in how they are to be taught), the $r_{sm}$ parameter could incorporate a measure of the student's affinity for the various teaching styles (determined, perhaps, from past performance), and the resulting schedules could be partly determined based on matching teaching style to preferred learning style.

It will be understood by one skilled in the art that aspects of the present invention described hereinabove can be embodied in a computer running software, and that the software can be supplied and stored in tangible media, e.g., hard disks, floppy disks or compact disks, or in intangible media, e.g., in an electronic memory, or on a network such as the Internet. It will also be appreciated that the input of data as well as the output of schedules and other computational products may be effected by means of peripheral devices, such as keyboards, telephones, automated telephone or telephone menu systems, personal digital assistants (PDAs), beepers, pagers, or other electronic messaging devices, video screens, printers and the like, as well as by the utilization of "Web" browsers (including associated plug-ins and similar software) or any other Internet interface, as are known in the art. In particular, schedules for students and teachers, and student and teacher inputs, may be delivered through a variety of mechanisms (such as through Web browsers, hard copies, phone systems, pagers, and personal digital assistants), for the convenience of the students and teachers.

It will be appreciated that the various embodiments of the present invention are not limited to a teaching format that places a single teacher in front of a group of students in a physical classroom. Many other formats are included within the scope of the present invention. For example, a class could be scheduled to occur in a distance learning format, such as an on-line classroom, including video conferencing, chat rooms, email lists, on-line slide shows, and the like. Similarly, assessments, including homework and exams, may be conducted in the on-line environment. In accordance with a preferred embodiment of the present invention, each teaching format may be accorded an identifier in database 16 and associated with various modules, and data could be obtained reflecting the relative effectiveness of the different formats, based on student and teacher feedback and assessment information. Part of the optimization of a course of study could involve spreading out modules in the most efficient manner possible over the variety of different environments available. The expense of each format may also be taken into account, so that, for example, a country (or a particular educational institution) with fewer financial resources and computing infrastructure may restrict its students to human-to-human instruction, whereas a country or institution with greater infrastructure and resources may make it possible for many of its modules to be presented in online or other formats. In blended approaches, for example, student may end up spending part of the week in traditional classes, part in online classes, and part in job apprenticeship experiences.

In accordance with a preferred embodiment of the present invention, the various types of constraints and optimizations performed by the algorithm, such as meeting teacher or student preferences, will be displayed on administrator screens to allow control thereof by the administration (or teaching staff, or others) of the educational institution. Moreover, the administration will preferably be able to modify the different parameters to be optimized, or choose some and negate others. In this manner, the administration will have direct influence and control over how the scheduling algorithms optimize the various parameters, and therefore over what types of schedules are produced.

Alternatively or additionally, the administration's inputs to the scheduling algorithms may be entered as hard constraints or preferred specific goals. For example, the administration may specify appropriate inputs to the scheduling algorithms, such as what percentage of an average student's day should be scheduled in a tutoring session, or what percentage of a given teacher's week should include training or being trained. Similarly, an input parameter may specify that most students should spend approximately an equal amount of time as tutors and as tutees.

Preferably, the administration will be able to readily generate many different scheduling "templates," with different priorities, constraints, goals, or other input parameters, save these templates in special file formats for recall later, and compare the different schedules that are produced based on the contents of each template. Thus, for example, the administrators may specify a range of template parameters including a maximum physical age difference to be permitted in classes or tutoring sessions, and specific constraints for tutoring sessions (such as whether younger students should be permitted to tutor older students, and if yes, by how much younger; or whether cross-gender tutoring sessions are permitted). The scheduling algorithms, in turn, will create classes and tutoring sessions which meet the constraints of each template, sacrificing (if necessary) whatever degree of optimization of other parameters is necessary or expedient in order to do so. In this manner, the administrators are able to review the effects of the designated input parameters on other factors, such as teacher workload, or the overall percentage of students' time assigned to study halls. In turn, the administrators can evaluate, essentially in real time, the effects of the various scheduling compromises inherent in each template. For example, it may be determined that decreasing the maximum allowable class size for students with learning disabilities from twelve to nine can be most easily achieved by increasing by 50% the maximum allowed time that students need for travel between classrooms.

In a preferred embodiment of the present invention, queries can be entered into the scheduling program, such as: What single input parameters or combinations of parameters can be changed so as to produce a particular change in a generated schedule. Answers to the query may reveal, for example, that allowing competent younger students to tutor older students will allow average class size to be reduced by 10%, without increasing the number of students in study halls.

Typically, administrative decisions and queries will be entered in a graphical user interface. However, they may be similarly entered in any other manner known in the art, such as through a command-line based system, through a transmitted file, through a scanned-in paper interface, or through a phone system interface.

In accordance with a preferred embodiment of the present invention, the students and teachers at a large educational institution (or even a smaller one) may be sub-divided into two or more separate "academies" or "learning communities." In such an event, each of the academies may have its own set of modules, which may be "weighted," as explained above, in accordance with the specific needs or goals of each of the academies. For example, in a high school, one academy could focus more of its modules, (or provide more emphasis within the same set of modules, on the humanities, while another could focus more heavily on math and science. In general, the program would schedule the students from one academy with the teachers from that academy, although students may be assigned, as appropriate, to classes with teachers from another academy. This small "learning community" embodiment of the invention could be combined with the tutoring elements of the invention to broker learning exchanges between the academies. For example, students from a math and science academy would tutor students from a humanities academy in math and science, and students from a humanities academy would tutor students from a math and science academy in English, history, and foreign languages. The actual module definitions (including super-modules), weights assigned to the modules, special education codings for modules, and the like could be formally defined for each academy in a template as indicated below.

In a preferred embodiment of the invention, a template may be defined based on the particular pedagogical approach of an educational institution (or for several approaches within the institution, if a small learning community model is used). However, although the template may represent a particular pedagogical approach overall, the template would be highly and specifically technically defined within the parameters of the invention, so as to be readily re-usable. The template preferably includes specific numbers representative of such information as:

$A_C$, $S_C$, $k_i$, and other constants and parameters described herein which typically are not specific to particular students or teachers, and therefore generally guide the overall functioning of the scheduling program, the definitions of the curricular modules, threshold passing grades, prerequisite requirements for taking any module, the dependency relationships between the modules, the importance assigned to various modules through weights (e.g., to reflect the centrality of the modules to the core curriculum of the institution), connection strengths between the modules (which indicate how important it is that they follow one another in sequence without significant time gaps therebetween), the various formats for the modules (such as human-to-human or online),
preferred locations for teaching the modules and preferred equipment associated therewith,
learning disabilities coding of the modules (including, for example, (a) in which modules students with different learning disabilities of varying degrees may be mixed with mainstream students and with each other, and (b) for each module, the maximum number of students who can participate in a class if a student with a particular disability is present),
super-module definitions,
lesson plans associated with particular modules or super-modules,
particular language(s) of instruction (including, for example, which modules may be used to mix native and non-native speakers),
learning, teaching, and assessment styles associated with particular modules,
how much of students' schedules should include tutoring,
how heavily the scheduler should consider teacher preferences,
how heavily the scheduler should consider student preferences,
the maximum age differences permitted in classes or tutoring (either in general or defined for each module), and
all of the various different types of information as described in this patent application, as appropriate.

Such a template could then be made available for use by other educational institutions, which could also modify it and adapt it to their specific needs. The template would provide a concise way for an educational institution to specify and transmit to others its pedagogical approach, and could serve as an efficient means for facilitating the widespread implementation of some embodiments of the present invention. The templates may be published, for example, on the World Wide Web, or transmitted in a variety of other electronic or printed formats.

The power of such templates would be particularly noteworthy, because they provide a highly precise and explicit definition of the pedagogical priorities and approach of an educational institution, in a format that is quickly and readily re-used and modified by other educational institutions across the world. For example, if a school that focused largely on learning disabled children worked out a highly successful template based on an educational model including the following elements:

(a) defining which modules are amenable for mixing in one class learning disabled students of certain categories and degrees of disability with mainstream students and with each other, (b) defining what and how much teacher training is needed for each module, with respect to each learning disability category, and (c) defining how the schedule should prioritize fulfilling the various constraints (and when to make compromises), then the school could share that knowledge with others by exporting their template. Other educational institutions could then make use of all or part of the template for the benefit of their students. They could, for example, simply download the template off the World Wide Web for themselves, and modify or choose from it accordingly.

In another example, templates developed within the culture of a country that emphasizes individual choice may have their student choice parameters set at a much higher priority than templates developed within the culture of another country that emphasizes top-down control. Similarly, a school that emphasizes proficiency in the sciences may set the requirement for a student to be considered to have fulfilled a math prerequisite to be higher than in a school for the arts.

In a preferred embodiment of the invention, a textbook template is provided, representing a core set of modules taught with most standard (or even non-standard) textbooks. So, for example, a core curriculum for an American K-12 school system could be developed which describes each module, indicates the dependency relationships between the modules, and specifies, for each module, the page numbers in various textbooks where the content of the module is taught. Preferably, a school administrator would be enabled to enter the names of textbooks owned by the school into a software program provided by this embodiment, and the program would be operative to display the page numbers from these textbooks which pertain to each of the modules, and to input that information into the database for use by the scheduler.

For some applications, the program is additionally enabled to track in data storage device 16 the specific textbook resources of the educational institution, and, for example, provide a listing of how many of each textbook the educational institution owns. Preferably, the scheduling algorithms would be operative to schedule modules based on the number of available textbooks, so that students can check out the textbooks in advance in an orderly fashion.

Similarly, the scheduler would preferably also be operative to schedule modules that require special equipment or facilities in accordance with the availability thereof. So, for example, if certain chemistry modules must be taught in particular classrooms having appropriate laboratory equipment, the scheduler would be operative to only schedule those modules in such classrooms. In another example, a module may be taught in a computer lab and use a computer-assisted instruction multimedia CD-ROM program. In these cases, the scheduler would be operative to place in the lab at any given time only as many students as there are available CD-ROM programs and computers needed to run them.

In accordance with a preferred embodiment, the modules of an educational institution may be coded according to a range of learning styles and/or teaching styles. For example, the material in a particular chapter in a chemistry textbook could be represented in its entirety in three different modules, directed respectively to lecture, laboratory, or library research formats. Typically, students and teachers will be maximally effective in the format most closely reflecting their own individual styles. Similarly, some high school teachers and students may prefer an informal classroom, in which the students do group projects and call the teachers by first name, while other teachers and students may flourish in a more traditional atmosphere.

Although the science of assessing student learning styles is to some extent imprecise, there are powerful proponents of this concept in the educational community, and, it is believed that considerable advantage can be obtained through establishing certain modules in accordance therewith. In general, one teaching style may be defined for a given learning style; however, one teaching style may also be appropriate to several learning styles, or one learning style may be appropriate to several different teaching styles. Preferably, teachers would indicate which teaching styles they prefer or for which they have appropriate training (either in general or for particular modules), and students would indicate—or be assessed by suitable diagnostic methods to determine—which learning styles are most appropriate or enjoyable for them.

In an advanced embodiment of the invention, students could indicate or be assigned different learning styles for different subject areas or even for specific modules within a subject area. The program would then optimize placing students with a certain learning style (either in general, or in particular subjects or modules) with teachers whose teaching style (either in general, or in particular subjects or modules) matches the students' learning style. It will be appreciated that there are many ways to associate learning styles and teaching styles (one-to-one, many-to-one, many-to-many, etc.) and all are within the scope of the present invention. In a preferred embodiment, learning styles and teaching styles are matched one-to-one, i.e., one teaching style is matched to each learning style.

It is noted that because teacher-student rapport is often an important factor in educational success, the scheduling algorithm is preferably programmable so as to emphasize placing students with the same teachers, particularly if they have had success in the past with those teachers. Applications of the present invention for use with small learning communities, for example, typically naturally associate a group of teachers with the sub-groups of students that make up a mini-academy, so that the students can develop and profit from an ongoing relationship with their teachers. Alternatively, the scheduling algorithm may produce a similar effect by applying a bias towards keeping particular teachers together with particular students over time. Determining which teachers get priority for certain students could be based on student feedback mechanisms, such as written, electronic, or oral input indicating which teachers they feel are best for them and which they prefer. For K-12 students, parental feedback may be accepted, as well. Typically, teachers indicate in a similar fashion which students they feel they can impact the most.

Alternatively or additionally, the feedback data may be obtained directly from assessment information collected during or following completion of a module, to allow comparative analyses to be performed over time in order to determine which students improve the most with which teachers. In turn, students are preferably assigned to classes taught by those teachers with whom they have improved the most in the past. Alternatively, the assignment of students to particular teachers may be essentially random, in situations in which it is believed that it is better to have students spend more time with a teacher or with a small group of teachers than to be assigned to a large number of teachers in the educational institution.

Regardless of the specific mechanism for choosing which students should be placed more often with which teachers, the scheduler preferably implements that choice by putting a "stickiness" factor $Z_{st}$ into its calculations, which provides a bias towards scheduling student s with teacher t. In this manner, students will find themselves more often placed with a given teacher over their time at an educational institution, and therefore will have a better chance of developing closer rapport with their teachers. If appropriate, the stickiness factor can be defined as $Z_t$, representing the extent to which it is desirable that teacher t teaches the same students, or the stickiness factor can be defined as $Z_s$, representing the extent to which student s would tend to benefit from being in classes generally with the same teachers.

It will also be appreciated that the various embodiments of the present invention can be combined in various ways, as illustrated in the following (non-limiting) examples, so as to maximize the inherent power and flexibility provided by aspects of the invention:

(a) The assigning of tutor-tutee pairs may be effectively combined with the weighting of the curricular modules so as to place students in tutoring pairs more often in the core modules than others.

(b) The data concerning assessments of students in modules having multiple teaching formats (such as on-line and traditional) can be analyzed so as to determine which format produces superior results. Based on this analysis, the program may be operative to preferentially schedule classes for these modules in the format producing the superior results.

(c) The scheduling of tutor-pairs may be used together with the data concerning teacher competency to enhance the opportunities for teacher retraining by the teaching staff of the educational institution itself. Thus, teachers who have been determined to be "master teachers" (based upon past teacher performance with students) may be scheduled to teach a class for other teachers in how to teach a particular module. Similarly, a teacher who requires training in a particular module may be assigned to observe a master teacher teaching a class of students in that module, or the master teacher may be assigned as an observer of a class in that module taught by another teacher who has not been successful in the past in teaching that module (based on student assessment data).

This "in-house" retraining of teachers may be implemented on a larger scale when the percentage of students tutoring one another is increased, thereby freeing up the teaching staff to be scheduled for training sessions. So, for example, an educational institution that requires a greater than average amount of teacher retraining could adopt a strategy (and build a template to promote that strategy among other educational institutions) such as the following:

focus the students initially on mastering a relatively limited set of "core of the core" modules (the most-heavily weighted modules);

as students gain expertise in those modules, assign them as tutors of each other as much as possible;

use the relatively high level of student tutoring to free up the best trained educational staff to teach the rest of the staff new teaching techniques in more modules; and once the staff are better trained, shift the focus of the educational institution towards the wider set of modules the teachers now feel capable of teaching well.

(d) The definition of an "educational institution" may be extended to include a community of families who help one another to educate their children at home. The parents involved could indicate through a Web interface or some other means which modules they are capable of supervising, which modules they are capable of teaching (and their formats), when they are available for phone calls, for having other children over at their homes, for visiting other homes, etc. The program would be operative to coordinate the teaching activities of the members of the community in order to better educate the children of the community within the constraints and boundaries set by parents, e.g., who should be permitted to help educate their children. It is noted that examples of class formats and preferred teaching styles include having a parent who has a good grasp of the content of a module available by telephone during hours specified by the parent. Similarly, a community-based home-schooling class style scheduled in accordance with a preferred embodiment of the present invention could include a conference call that facilitates a group tutoring session including a parent with several children.

(e) Features of the invention may be employed to enhance special education, by permitting students with disabilities to be partially home-schooled by parents while attending more traditional classes with other students (both non-disabled students and students with the same or different disabilities).

(f) Aspects of the present invention will enable enhanced coordination between different levels of educational institutions. For example, high schools will be able to generate specialized transcripts that define student strengths and weaknesses at the module level, as well as at the traditional semester or quarterly length course level, thereby providing a better indication for the placement of the students when they enroll in college. In addition, by associating a set of modules with a traditional course, and averaging grades in an appropriate manner (such as in a weighted average manner, where the modules within the course that constitute a greater percentage of its content account for a greater percentage of the course's grade), high schools will be able to generate traditional transcripts for their students.

Modules may also be associated on a transcript in groupings that differ from traditional course make-ups. For example, a college physics department could analyze the module assessments of a high school student across the specific math and physics modules deemed most relevant for success in the college physics program. In another example, a student transferring between two junior high schools would have a transcript which would provide the new school with detail about his module-by-module mastery of the curriculum. It is noted that this ability is not easily obtainable using the tools of the prior art. The new school (employing software provided in accordance with an embodiment of the invention) could take advantage of the information in the transcript by using the scheduling program's dynamic scheduling capability to, for example, focus studies in the student's weak areas, or continue to challenge him in strong areas.

(g) Scheduling algorithms operating in two or more educational institutions can cooperate with each other at a level not currently feasible using scheduling tools known in the art. For example, one educational institution with a math-science focus may offer its students as tutors in math and science in an exchange with another educational institution, which has a humanities focus, which would offer its students as tutors in English, history, and foreign language modules. The educational institutions would specify in which formats their students are available to tutor (e.g., as in-person, telephone, or video tutors), and the scheduler would be operative to meet the constraints imposed on it by the educational institutions.

In this manner, two educational institutions in the same geographic area may broker live human-to-human tutoring sessions at one or both of their institutions, whereas two educational institutions 2500 miles away from each other may broker phone tutoring sessions. In another example, a particular school district may arrange for a famous speaker to addresses the majority of the students enrolled in the various educational institutions within the district on a particular topic. While this event is taking place, many of the teachers could be scheduled to tutor other students individually in modules in which they require special attention. Similarly, an entire consortium of schools (such as a state university system, which may include tens of colleges) could cooperate in a like manner. Each institution could indicate what resources it can offer to the others, and the scheduler would be operative to enable schools to combine their resources while respecting their constraints. So, for example, one college may have a celebrated chemistry lecturer, whose lectures are conducted online (for all but the host college) across the state university system. Another college may contribute a number of phone tutors in the same course, who are available for tutoring sessions with either individual students or groups of students (via phone conferences) in any participating institution. In a preferred embodiment of the invention, a feedback mechanism is provided to indicate how much resources each educational institution is providing, so that the colleges could ensure general fairness across the system.

(h) The scheduling algorithms may be operative to schedule modules in accordance with a particular general scheduling technique, such as Block Scheduling. Block Scheduling is a recently popular movement that replaces traditional single-period scheduling with alternative block schedules, which often spread a class out in longer periods on one day, over fewer days in the week. (See, for example, the book entitled *Block Scheduling, A Catalyst for Change in High Schools*, by Robert Lynn Canady and Michael D. Rettig, 1995, Eye on Education, Inc.). There are effectively an unlimited number of ways to block schedule a large school, and in accordance with a preferred embodiment of the invention, the scheduling algorithm is operative to schedule at least some of the modules in conformity with a given set of block scheduling constraints indicated by the school.

It will be appreciated that most preferred embodiments of the invention will not generally optimize across every possible variable and feature at once, but rather that each educational institution will choose the feature(s) that are most important to it. For example, most educational institutions will use preferred embodiments of the invention that limit the number of module durations to a relatively small number, for easier scheduling. Since it is generally important that the schedules be generated in a timely fashion, the scheduling algorithm will preferably limit the computational time spent on finding a solution, accepting the level of optimization that is computable within a reasonable time frame. The typical amount of optimization performed will tend to increase as computing power becomes more inexpensive and fast (and indeed, massively parallel machines may be employed for server(s) 12 to make the computation as fast as possible). Some preferred embodiments of the invention will generally be implemented in a manner that restricts the educational institution to a feature set, or a level of optimization, that permits the generation of schedules to be done in a reasonably fast manner, or that permits the educational institution to choose the feature set and level of optimization that best meet its needs.

In a preferred embodiment of the present invention, a scheduling algorithm is operated by a teacher within a classroom to divide the students within the classroom into subgroups which are able to engage in various educational activities. Preferably, this in-class scheduling algorithm has access to records indicative of each student's mastery of a range of modules, and divides the class into groups responsive thereto. Once the students have been divided, the teacher can teach each group individually, leaving the groups not currently being taught to work on group projects or self-study. As appropriate, techniques described hereinabove for scheduling a large number of classes within a school may be adapted for use with this embodiment of the invention.

It will be appreciated that the various features described herein will enable educational institutions to optimize their use of their resources, thereby raising their level of performance for the benefit of both teachers and students. The flexibility inherent in these embodiments of the invention preferably allows a customized fit for the needs of a wide variety of educational institutions, including elementary, junior and senior high schools, home schooling, colleges and universities, graduate schools, vocational and job training environments, and the like. Each educational institution or environment may be fitted with a solution that caters to its primary needs—whether they be enhanced student preference, enhanced teacher preference, increased teacher re-training, smaller class size, integrating non-native speaking students, integrating learning disabled students, fitting learning styles to teaching styles optimally, etc.

Advantageously, and unlike many computer education packages which are commercially available, many embodiments of the present invention are fully functional substantially without requiring any purchases of new hardware by the educational institution. Thus, these embodiments generally do not require students to have access to a computer or even a school computer room.

It is noted that the optimizations performed in accordance with some preferred embodiments of the present invention are typically performed with respect to numerical optimization parameters which reflect a particular educational focus of a given school, e.g., the importance (0-100) of integrating disabled students into classes with the rest of the student body, or the importance (0-100) of placing emphasis in scheduling on facilitating peer tutoring. Prior art scheduling algorithms, by contrast, typically operate under constraints governed only indirectly (if at all) by the particular educational focus of the school. Thus, for example, they may guarantee that a teacher will not have to move between campuses twice in a day, or they may limit class sizes to a manageable number.

Persons skilled in the art will appreciate that the present invention is not limited to what has been particularly shown and described hereinabove. Rather, the scope of the present invention includes both combinations and subsets of combinations of the various features described hereinabove, as well as variations and modifications thereof, which would occur to persons skilled in the art upon reading the foregoing description.

COMPUTER CODE EXAMPLES

In a preferred embodiment of the invention, two examples of prototype computer code are given. Both are also included the file "Computer Code Examples 1 and 2" on the CDs labeled "Highmarks Patent CD" ("Copy 1" and "Copy 2"), that was included with the patent application. Sample results of the second code example are also included in the separate printout "Sample Results" as well as on the CDs in the file "Sample Results 1, 2, and 3". The second code example does multi-period scheduling. Both examples were done using the software program Mathematica (detailed information on version, etc. below). Mathematica can run on most popular operating systems such as LINUX, Windows, etc. The code was written on LINUX. Appropriate 'fake data' can be generated in Mathematica to run the simulation for which sample results are given as indicated above.

Computer Code Example 1

The following text is program code implements the algorithms of disclosure FIG. 5 (Procedures 510-590; "incremental" algorithm) and FIG. 6 (Procedures 610-680; "aggregate" algorithm). The code comprises instructions for the language interpreter associated with the _Mathematica_software package, version 4. It consists of a concatenation of 6 separate computer files, each with extension ".mdoc" implementing, respectively:

| | |
|---|---|
| "topLevelControl.mdoc" | overall direction of sample data generation, algorithm execution, and display of results |
| "auxFunctions.mdoc" | a set of auxiliary functions utilized by the other files |
| "sPeriodParams.mdoc" | set up sample data for a run scheduling one period of classes |
| "tutorSelectionAlg1.mdoc" | assigns pairs of tutors from the remaining pool of unscheduled students as described in Procedures 570-590 |
| "incrementalAlg.mdoc" | computes a schedule of classes and tutoring pairs for a single class period according to Procedures 510-590 |
| "aggregateAlg.mdoc" | computes a schedule of classes and tutoring pairs for a single class period according to Procedures 610-680 |

A double-row of asterisks separates the text of each file in the presentation here.
(\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*)
(\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*)
(\* topLevelControl.mdoc: Top level control and notes on structures used. \*)
(\* Pull in other files needed. \*)

Sample Results

Three different sets of sample results, all from Computer Code Example 2, are included in the attached printout "Sample Results". They are also included in MS-Word format in the two CDs that were submitted with this patent application in the file "Sample Results 1, 2, and 3". Those sample results are summarized below.

Sample Results 1
Algorithm Aggregate

Output from Procedures 610-680 as described in FIG. 6 and implemented in Computer Code Example 2. Includes separate computer code runs for small, medium, and large schools.

Sample Results 2
Aggregate Incremental

Output from Procedures 510-590 as described in FIG. 5 and implemented in Computer Code Example 2.

Includes separate computer code runs for small, medium, and large schools.

Sample Results 3

Schedules over a period of several weeks generated using Computer Code Example 2. These schedules were generated using the multi-period scheduling functionality in Computer Code Example 2.

The invention claimed is:

1. A method for automatically producing a schedule of classes for an educational institution having a curriculum, a plurality of teachers, and a plurality of students, the method comprising the computer implemented steps of:

receiving, as an input into a computer system, designations of a plurality of discrete curriculum modules of the curriculum, each curriculum module including educational material capable of being taught within less than 25 hours;

receiving, as an input into the computer system, curriculum information comprising an indication of which of the curriculum modules are prerequisite modules for subsequent curriculum modules and a weighted value for one or more curriculum modules which indicates how central the curriculum module is to the curriculum;

receiving, as an input into the computer system, teacher information, comprising, for each of the plurality of teachers, an indication of the teacher's level of teaching competence with respect to one or more of the modules;

receiving, as an input into the computer system, student information comprising, for each of the plurality of students, an indication of the student's level of competence with respect to the educational material of one or more modules;

executing a scheduling algorithm responsive to the designations of the curriculum modules, the curriculum information, the teacher information, and the student information;

wherein the scheduling algorithm prioritizes scheduling said teachers to classes for teaching the curriculum modules according to the quality of instruction that the teacher can provide in the modules and the weighted value of the module, preferentially assigning teachers with higher ranked competencies in teaching particular modules to teach those modules;

and generating a prioritized schedule of classes for the teachers and students responsive to executing the algorithm.

2. The method according to claim 1, wherein the scheduling algorithm receives a designation of certain ones of the curriculum modules as being critical at a given time for a significant group of students to meet the graduation requirements of the educational institution, and prioritizes scheduling classes of the critical curriculum modules before other modules are scheduled.

3. A method according to claim 1, wherein the scheduling algorithm prioritizes scheduling students in modules of high centrality with teachers with relatively higher competencies to teach the modules.

4. A method according to claim 1, wherein the scheduling algorithm prioritizes scheduling students in classes of the curriculum modules with one or more of the teachers according to the prior success one or more of the students has had with those teachers.

5. A method according to claim 1, wherein producing the schedule of classes comprises determining when a student has failed to attain a desired level of mastery of a module and subsequently assigning the student to study the educational material in the module in a class configured to facilitate the student to attain the desired level of mastery.

6. A method according to claim 1, and comprising receiving an assessment of a student's performance in one or more modules taught by a particular teacher, wherein producing the schedule of classes comprises preferentially assigning the student to be taught by the teacher if the assessment is positive, and inhibiting assigning the student to be taught by the teacher if the assessment is negative.

7. A method according to claim 1, wherein producing the schedule responsive to the indication of the centrality of a module comprises designating a high level of competence to be required of students taking classes in modules having a high centrality to the curriculum, and designating a low level of competence to be required of students taking classes in modules having a low centrality to the curriculum.

8. A method according to claim 1, and comprising receiving an administrative instruction as an input into the computer system, which designates students in a first category as having a first level of competence required when taking a class in a module to pass the module, and which designates students in a second category as having a second level of competence required when taking a class in a module to pass the module, the second level being different from the first level, wherein producing the schedules of classes comprises producing the schedule responsive to the administrative instruction.

9. A method according to claim 1, and comprising receiving an administrative instruction as an input into the computer system, which designates students in a first category as having a first level of competence required in prerequisite modules in order to be scheduled in classes teaching the module dependent upon the prerequisites, and which designates students in a second category as having a second level of competence required in prerequisite modules in order to be scheduled in classes teaching the module dependent upon the prerequisites.

10. A method according to claim 1, wherein receiving the teacher information comprises receiving, for at least some of the plurality of teachers, an indication of a preference of the teacher to teach one or more of the modules.

11. A method according to claim 1, wherein receiving the student information comprises receiving, for at least some of the plurality of students, an indication of a preference of the students to learn one or more of the modules.

12. A method for automatically producing a schedule of classes for an educational institution having a curriculum, a plurality of teachers, and a plurality of students, the method comprising the computer implemented steps of:

receiving, as an input into a computer system, designations of a plurality of discrete curriculum modules of the curriculum, each curriculum module including educational material capable of being taught within less than 25 hours;

receiving, as an input into the computer system, curriculum information comprising an indication of which of the curriculum modules are prerequisite modules for subsequent curriculum modules and a weighted value for one or more curriculum modules which indicates how central the curriculum module is to the curriculum:

receiving, as an input into the computer system: teacher information, comprising for each of the plurality of teachers, an indication of the teacher's level of teaching competence with respect to one or more of the modules;

receiving, as an input into the computer system: student information comprising, for each of the plurality of students, an indication of the student's level of competence with respect to the educational material of one or more modules and receiving an indication of prior success one or more of the students has had with one or more of the teachers;

executing a scheduling algorithm responsive to the designations of the curriculum modules, the curriculum information the teacher information, and the student information;

wherein the scheduling algorithm prioritizes scheduling said teachers to classes for teaching the curriculum modules according to the quality of instruction that the teacher can provide in the modules and the weighted value of the module, preferentially assigning teachers with higher ranked competencies in teaching particular modules to teach those modules.

13. A method according to claim 12, wherein producing the schedule responsive to the indication of the centrality of a module comprises designating a high level of competence to be required of students to pass modules having a high centrality to the curriculum, and designating a low level of competence to be required of students to pass modules having a low centrality to the curriculum.

14. A method according to claim 12, wherein receiving the teacher information comprises receiving, for at least some of the plurality of teachers, an indication of a preference of the teacher to teach one or more of the modules.

15. A method according to claim 12, wherein receiving the student information comprises receiving, for at least some of the plurality of students, an indication of a preference of the students to learn one or more of the modules.

16. A method for automatically producing a schedule of classes for an educational institution having a curriculum, a plurality of teachers, and a plurality of students, the method comprising the computer implemented steps of:

receiving, as an input into a computer system, designations of a plurality of discrete curriculum modules of the curriculum, each curriculum module including educational material capable of being taught within less than 25 hours;

receiving, as an input into the computer system, curriculum information comprising an indication of which of the curriculum modules are prerequisite modules for subsequent curriculum modules and a weighted value for one or more curriculum modules which indicates how central the curriculum module is to the curriculum;

receiving, as an input into the computer system, teacher information, comprising, for each of the plurality of teachers, an indication of the teacher's level of teaching competence with respect to one or more of the modules;

receiving, as an input into the computer system, student information comprising, for each of the plurality of students, an indication of the student's level of competence with respect to the educational material of one or more modules and for at least one of the students an indication of a learning disability of the student:

executing a scheduling algorithm responsive to the designations of the curriculum modules, the curriculum information, the teacher information, and the student information;

wherein the scheduling algorithm prioritizes scheduling said teachers to classes for teaching the curriculum modules according to the quality of instruction that the teacher can provide in the modules and the weighted value of the module, preferentially assigning teachers with higher ranked competencies in teaching particular modules to teach those modules;

generating a prioritized schedule of classes for the teachers and students responsive to executing the algorithm.

17. A method according to claim 16, wherein receiving the teacher information comprises receiving an indication of one or more of the teachers who have specialized training or capacity to teach students with the learning disability, and wherein producing the schedule comprises preferentially assigning the one or more of the teachers with the specialized training or capacity to teach a student with the learning disability.

18. A method according to claim 16, wherein receiving the curriculum information comprises receiving an indication of curricular formats that are appropriate for particular learning disabilities, and wherein producing the schedule comprises assigning students to classes where modules are taught with said curricular formats.

19. A method according to claim 16, wherein receiving the curriculum information comprises receiving an indication of curricular formats that are appropriate for combinations of particular learning disabilities with particular modules, and wherein producing the schedule comprises assigning students to classes where modules are taught with said curricular formats.

20. A method according to claim 16, wherein receiving the teacher information comprises receiving an indication of one or more of the teachers who have specialized training or capacity to teach students with the learning disability, and wherein receiving the curriculum information comprises receiving an indication of curricular formats that are appropriate for particular learning disabilities, and wherein producing the schedule comprises assigning students to classes where modules are taught with said curricular formats by one or more of the teachers with the specialized training or capacity to teach a student with the learning disability.

\* \* \* \* \*